United States Patent
Asada et al.

(10) Patent No.: US 8,378,627 B2
(45) Date of Patent: Feb. 19, 2013

(54) ELECTRIC SUPPLY CONTROLLER, ELECTRIC SUPPLY SYSTEM AND METHOD FOR CONTROLLING ELECTRIC SUPPLY TO CHARGER AND VEHICLE

(75) Inventors: Hiroshige Asada, Nagoya (JP); Takashi Kanamori, Nagoya (JP); Shinya Taguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 12/801,861

(22) Filed: Jun. 29, 2010

(65) Prior Publication Data

US 2011/0031929 A1    Feb. 10, 2011

(30) Foreign Application Priority Data

Aug. 5, 2009    (JP) ................. 2009-182380

(51) Int. Cl.
*H02J 7/00* (2006.01)
*H02J 1/00* (2006.01)
*G07F 19/00* (2006.01)
*B60W 10/24* (2006.01)

(52) U.S. Cl. .......... 320/109; 705/34; 180/65.29; 307/80
(58) Field of Classification Search ............ 320/109
See application file for complete search history.

(56) References Cited

U.S. PATENT DOCUMENTS

| | | | |
|---|---|---|---|
| 5,594,318 A | 1/1997 | Nor et al. | |
| 2004/0130292 A1* | 7/2004 | Buchanan et al. | 320/116 |
| 2010/0019723 A1* | 1/2010 | Ichikawa | 320/109 |
| 2010/0033018 A1* | 2/2010 | Fukasawa et al. | 307/80 |
| 2010/0106631 A1* | 4/2010 | Kurayama et al. | 705/34 |

FOREIGN PATENT DOCUMENTS

| | | |
|---|---|---|
| JP | A-S58-26536 | 2/1983 |
| JP | A-03-015232 | 1/1991 |
| JP | A-H09-098513 | 4/1997 |
| JP | A-H10-080071 | 3/1998 |
| JP | A-2004-364388 | 12/2004 |
| JP | A-2008-117444 | 5/2008 |
| JP | A-2008-247080 | 10/2008 |
| JP | A-2008-312401 | 12/2008 |
| JP | 2 110 923 | 10/2009 |

OTHER PUBLICATIONS

Office Action mailed Sep. 20, 2011 in corresponding JP application No. 2009-182380 (English translation enclosed).
Notification of Irregularity dated Aug. 31, 2010 in corresponding FR application No. 10 55711 (English translation enclosed).

* cited by examiner

Primary Examiner — M'Baye Diao
(74) Attorney, Agent, or Firm — Posz Law Group, PLC

(57) ABSTRACT

Chargers are connectable with vehicles. An electric supply controller controls a switching circuit to connect an electric power supply line to one of the chargers. A storage unit of the electric supply controller associates information on a priority to each of the vehicles and stores the associated information therein. When the vehicles are simultaneously connected to different chargers, a control unit of the electric supply controller controls the switching circuit to connect the electric power supply line preferentially to one of the different chargers. The one of the different chargers is connected to one of the vehicles assigned with a highest priority.

10 Claims, 15 Drawing Sheets

FIG. 3
```
ID OF VEHICLE A ── PRIORITY: 2
ID OF VEHICLE B ── PRIORITY: 1
ID OF VEHICLE C ──⎰PRIORITY: 3
                  ⎱VALID PERIOD : LATE-NIGHT OFF-PEAK HOURS
ID OF VEHICLE D ──⎰PRIORITY: 3
                  ⎱VALID PERIOD : FROM NIGHT BEFORE HOLIDAY
                                  TO NIGHT BEFORE WEEKDAY
```
FIG. 4
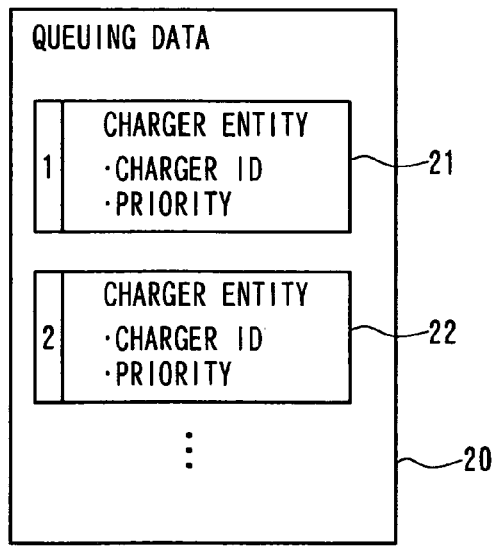
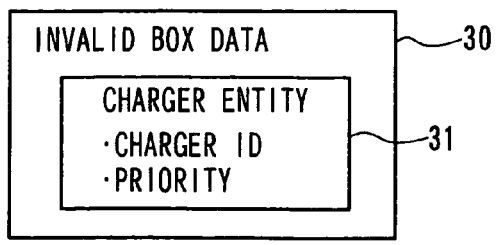

FIG. 14

```
ID OF CHARGER P —— PRIORITY:2
ID OF CHARGER Q —— PRIORITY:1
ID OF CHARGER R —— {PRIORITY:3
                    VALID PERIOD:LATE-NIGHT OFF-PEAK HOURS
ID OF CHARGER S —— {PRIORITY:3
                    VALID PERIOD:FROM NIGHT BEFORE HOLIDAY
                                 TO NIGHT BEFORE WEEKDAY
```

ELECTRIC SUPPLY CONTROLLER, ELECTRIC SUPPLY SYSTEM AND METHOD FOR CONTROLLING ELECTRIC SUPPLY TO CHARGER AND VEHICLE

CROSS REFERENCE TO RELATED APPLICATIONS

This application is based on and incorporates herein by reference Japanese Patent Application No. 2009-182380 filed on Aug. 5, 2009.

FIELD OF THE INVENTION

The present invention relates to an electric supply controller and an electric supply system. The present invention further relates to a method for controlling electric supply to charger and vehicle.

BACKGROUND OF THE INVENTION

Conventionally, a known vehicle has a rechargeable battery as a power source for accumulating an electric energy for traveling. In particular, a plug-in vehicle is configured to charge a rechargeable battery from a power supply outside the self-vehicle. For example, an electric vehicle (EV) and a plug-in hybrid vehicle (PHV) are known as examples of a plug-in vehicle. There are multiple proposed arts for charging a rechargeable battery of a plug-in vehicle. For example, Japanese unexamined patent application publications 2008-117444, 10-80071, and 2008-247080 disclose arts for charging multiple vehicles from one power supply source. Specifically, Japanese unexamined patent application publication 2008-117444 discloses an electric supply apparatus in which rechargeable batteries of multiple vehicles are connected in parallel with a power supply source for simultaneously charging the rechargeable batteries. In this case, the power supply source needs to have a large capacity in order to charge the rechargeable batteries simultaneously. In this case, a user having the electric supply apparatus needs to make a contract with an electric power company to consume a large electric power. Consequently, a basic contract fee for electricity may become high. On the other hand, Japanese unexamined patent publication 10-80071 discloses a control to shift charge time points of multiple vehicles so as to suppress the capacity of a power supply source. Specifically, an order of charge of second batteries are determined according to charge time periods of the rechargeable batteries. However, the order of charge of the second batteries determined according to the charge time periods does not necessarily reflect an intention of a user of a vehicle.

SUMMARY OF THE INVENTION

In view of the foregoing and other problems, it is an object of the present invention to produce an electric supply controller and an electric supply system each configured to set an order to charge rechargeable batteries of multiple vehicles from one power supply source so as to enhance convenience of a user of a vehicle. It is an object of the present invention to produce a method for controlling electric supply to charger and vehicle.

According to one aspect of the present invention, an electric supply controller for controlling a switching circuit to connect an electric power supply line to one charger selected from a plurality of chargers, the plurality of chargers being connectable with a plurality vehicles, the electric supply controller comprises a storage unit configured to associate information on a priority to each of at least part of the plurality of vehicles and configured to store the associated information therein. The electric supply controller further comprises a control unit configured to control the switching circuit, when at least part of the plurality of vehicles are simultaneously connected to different chargers, so as to connect the electric power supply line preferentially to one of the different chargers, the one of the different chargers being connected to one of the plurality of vehicles, which is assigned with a highest priority. The electric supply controller further comprises an electric supply system configured to connect an electric power supply line to one charger selected from a plurality of chargers including a first charger and a second charger connectable with vehicles, wherein the electric supply system is configured to cause the switching circuit, in a condition where the electric supply system causes a switching circuit to connect the electric power supply line to the first charger being connected to a vehicle, to switch the electric power supply line to be connected to the second charger when an other vehicle is connected to the second charger, the second charger being beforehand assigned with a priority higher than a priority of the first charger.

According to one aspect of the present invention, a method for controlling electric supply to one of a first vehicle and a second vehicle from one of a first charger and a second charger, the method comprises causing a switching circuit to connect the electric power supply line to the first charger being connected to the first vehicle. The method further comprises causing the switching circuit to switch the electric power supply line to be connected to the second charger when the second vehicle is connected to the second charger and when a priority assigned to the second vehicle is higher than a priority assigned to the first vehicle.

According to one aspect of the present invention, a method for controlling electric supply to one of a first vehicle and a second vehicle from one of a first charger and a second charger, the method comprises causing a switching circuit to connect the electric power supply line to the first charger being connected to the first vehicle. The method further comprises causing the switching circuit to switch the electric power supply line to be connected to the second charger when another vehicle is newly connected to the second charger and when a priority assigned to the second charger is higher than a priority assigned to the first charger.

BRIEF DESCRIPTION OF THE DRAWINGS

The above and other objects, features and advantages of the present invention will become more apparent from the following detailed description made with reference to the accompanying drawings. In the drawings:

FIG. 3 is a view showing one example of electric supply condition information;

FIG. 4 is a schematic diagram showing a queuing data and an invalid box data;

FIG. 14 is a view showing one example of electric supply condition information according to a second embodiment;

DETAILED DESCRIPTION OF PREFERRED EMBODIMENTS

First Embodiment

Figure 1:
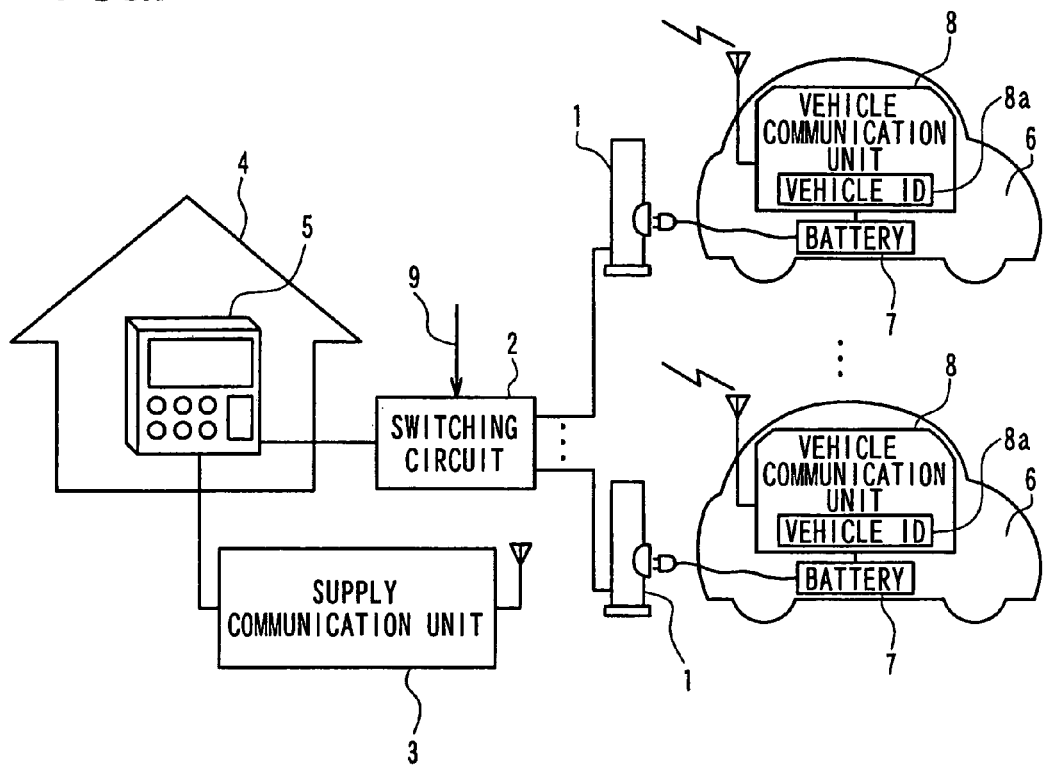
FIG. 1 is a block diagram showing an electric supply system.

As follows, the first embodiment will be described. FIG. 1 shows an electric supply system related to the present first embodiment. The electric supply system includes multiple chargers 1, a switching circuit 2, an electric supply communication unit 3, and an electric supply controller 5. The electric supply controller 5 is in a house 4. The electric supply system is configured to charge multiple plug-in vehicles 6. Each of the multiple plug-in vehicles 6 includes a battery 7 and a vehicle communication unit 8. The battery 7 is a rechargeable battery configured to be repeatedly charged. The vehicle communication unit & is, for example, a wireless LAN device for wireless communications. The battery 7 is configured to accumulate an electric energy of, for example, 8 kWh to 16 kWh at the maximum. The plug-in vehicle 6 utilizes the electricity accumulated in the battery 7, as traveling energy. Specifically, the plug-in vehicle 6 consumes electricity of the battery 7 to drive a motor (not shown) thereby to travel with a driving force of the motor. Such as an electric vehicle (EV) and a hybrid vehicle (HV) are known as a vehicle, which consumes electricity accumulated in the battery 7 as an energy source to travel. An electric vehicle travels only with a driving force of a motor driven with the electricity accumulated in the battery 7. A hybrid vehicle travels with a driving force of a motor, which is driven with electricity accumulated in the battery 7, and a driving force of an internal combustion engine.

The vehicle communication unit 8 is, for example, a wireless LAN device for performing near-field wireless communications with the electric supply communication unit 3. The vehicle communication unit 8 stores information on a vehicle ID 8a for uniquely identifying the vehicle mounted with the vehicle communication unit 8. The vehicle communication unit 8 is configured to transmit information on the vehicle ID 8a to the electric supply communication unit 3 when the vehicle communication unit 8 comes into a range to be communicable with the electric supply communication unit 3.

The vehicle communication unit 8 detects a charge quantity of the battery 7, by a generally-known method. The charge quantity of the battery 7 corresponds to an electric power accumulated in the battery 7. The vehicle communication unit 8 repeatedly transmits a group of the vehicle ID 8a of the self-vehicle and information on the charge quantity of the battery 7 to the electric supply communication unit 3, while being in a range communicable with the electric supply communication unit 3. For example, the vehicle communication unit 8 periodically transmits the group of the vehicle ID 8a at an interval of 1 minute.

In the example of FIG. 1, the number of the plug-in vehicles 6 is two. It is noted that three or more plug-in vehicles may be charged using the electric supply system.

The multiple chargers 1 are, for example, located in a parking lot adjacent to the house 4. In the example of FIG. 1, the number of the chargers is two. It is noted that three or more chargers may be provided. Each of the multiple chargers 1 is connectable with one of the plug-in vehicles 6 through a power line. Each of the chargers 1 has a generally-known detecting mechanism to detect whether the plug of the power line is inserted into a plug opening (not shown) provided in the self device for supplying electricity. According to the detection result, each of the chargers 1 periodically outputs a signal specifying that the plug is inserted or the plug is not inserted through the switching circuit 2 to the electric supply controller 5. Alternatively, each of the chargers 1 may output such a signal when the detection result changes.

The switching circuit 2 is, for example, located in the house 4. The switching circuit 2 is an electric circuit to connect an electric power supply line 9 with one of the multiple chargers 1. The electric power supply line 9 is extended from the outside in order to supply an electricity for charge. For example, the electric power supply line 9 may be extended from a power line of an electric power company. The chargers 1 are configured to switch a connection state with the electric power supply line 9. The switching circuit 2 is configured to switch a device connected to the electric power supply line 9 according to a control of the electric supply controller 5. The switching circuit 2 may be a generally-known relay circuit, for example.

When either of the plug-in vehicles 6 is connected to a charger connected to the electric power supply line 9, the battery 7 of the plug-in vehicle can be charged with electricity supplied through the electric power supply line 9. In the present example, the battery 7 can accumulate an electric power of 8 kWh to 16 kWh, as described above. Therefore, in the present example, the electric power supply line 9 is capable of supplying electricity of about 1500 W in order to complete charge of the battery 7 within a predetermined time.

The electric supply communication unit 3 is located inside the house 4 or outside the house 4. When a plug-in vehicle 6 is in the parking lot, in which the multiple chargers 1 are provided, the electric supply communication unit 3 is communicable with the vehicle communication unit 8 of the plug-in vehicle 6. The electric supply communication unit 3 receives information through a communication with the vehicle communication unit 8 and outputs the received information to the electric supply controller 5. The electric supply communication unit 3 is configured to transmit a signal to the vehicle communication unit 8 according to a control of the electric supply controller 5. The electric supply controller 5 is configured to obtain information from the electric supply communication unit 3 and control the switching circuit 2 according to the obtained information and beforehand stored information on a priority of each of the vehicles so as to switch the charger supplied with an electricity for charge.

Figure 2:
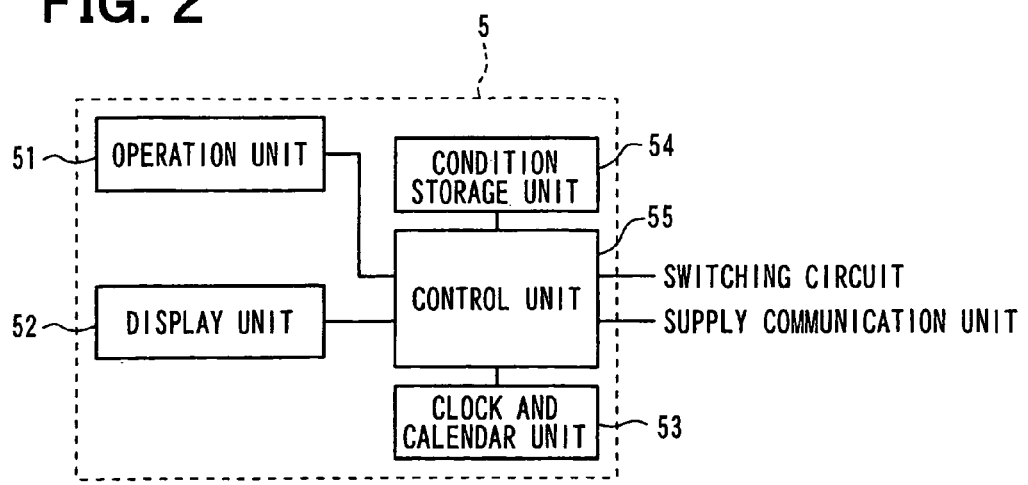
FIG. 2 is a block diagram showing an electric supply controller of the electric supply system.

FIG. 2 is a diagram showing the electric supply controller 5. The electric supply controller 5 includes an operation unit 51, a display unit 52, a clock and calendar unit 53, an electric supply condition storage unit 54, and a control unit 55. The operation unit 51 is configured to receive an operation of a user of the electric supply system and the plug-in vehicle 6 and output a signal, which specifies a content of the received operation, to the control unit 55. The display unit 52 is a display device such as a liquid crystal display configured to indicate a character and an image to provide a user of information according to a control of the control unit 55. The clock and calendar unit 53 is configured to obtain a present date and time and output information on the obtained present date and time to the control unit 55. The clock and calendar unit 53 stores calendar information, which includes a date (year, month, day) associated with information on whether the date is a holiday including Saturday, Sunday, a public holiday, a summer vacation, and the like. According to the calendar information, the clock and calendar unit 53 outputs information on whether today is a holiday and information on whether tomorrow is a holiday to the control unit 55. The electric supply condition storage unit 54 is a rewritable storage medium such as a flash memory. The electric supply condition storage unit 54 is configured to store electric supply condition information inputted by a user using the operation unit 51. The electric supply condition information includes information on a priority associated with each of the multiple plug-in vehicles 6.

FIG. 3 is a graph showing one example of the electric supply condition information. In the present example of the electric supply condition information, the vehicle ID of each of the four plug-in vehicles is associated with the priority information. Specifically, the priorities of 2, 1, 3, 3 are respectively assigned to the vehicle IDs of the vehicles A, B, C, D. As the value of the priority becomes greater, the priority of the vehicle becomes greater. That is, the vehicle with a greater number has a higher priority. A valid period of the priority can be arbitrarily specified to the information on the priority. In the example of FIG. 3, a valid period is not specified to the priority of each of the vehicles A and B. In the present example, the priority of each of the vehicles A and B is regularly valid. Contrary, a valid period is specified to the priority of each of the vehicles C and D. In the present example, the priority of each of the vehicles A and B is valid only in the specified valid period.

The electric supply condition storage unit 54 further stores information on a charger ID beforehand for uniquely identifying each charger 1. A user can add the information on the charger ID using the operation unit 51. In this way, when a charger is added, the charger ID of the additional charger can be easily registered.

The control unit 55 is a microcomputer including a CPU, a RAM, a ROM, and the like. The CPU reads a program stored in the ROM and executes the program in the RAM so as to perform various operations. In execution of the various operations, the control unit 55 arbitrarily controls the switching circuit 2 and the display unit 52 to obtain information from the operation unit 51 and the clock and calendar unit 53. The control unit 55 further performs read-out and the writing of information with respect to the electric supply condition storage unit 54. The control unit 55 further exchanges a signal with the electric supply communication unit 3.

As follows, an operation of the electric supply system will be described. First, an operation for establishment of a wireless connection between the vehicle communication unit 8 of the plug-in vehicle 6 and the electric power supply line 9 will be described. The electric supply communication unit 3 repeatedly transmits a polling signal at a predetermined interval such as 1 second in a communicable range including the locations of the multiple chargers 1. When the plug-in vehicle 6 comes into the communicable range with the electric supply communication unit 3, the vehicle communication unit 8 receives the polling signal. Thereby, the vehicle communication unit 8 transmits a connection request signal to the electric supply communication unit 3 for requesting a wireless connection with the electric supply communication unit 3. The connection request signal may include the vehicle ID 8a and a legal key, such as an encrypted WEP key, used for certification in a wireless LAN and the like.

The electric supply communication unit 3 receives the connection request signal and determines whether the received connection request signal includes a legal key. When the received connection request signal includes a legal key, the electric supply communication unit 3 permits connection with the vehicle communication unit 8. In this case, the electric supply communication unit 3 further transmits a signal specifying permission of the connection to the vehicle communication unit 8. Henceforth, the electric supply communication unit 3 deems a signal transmitted from the vehicle communication unit 8 and including the vehicle ID 8a to be a legal signal. That is, the electric supply communication unit 3 treats the vehicle ID as a legal vehicle ID. As a result, a wireless connection between the electric supply communication unit 3 and the vehicle communication unit 8 is established.

Alternatively, when the electric supply communication unit 3 receives a connection request signal and determines a key included in the connection request signal not to be legal, the electric supply communication unit 3 does not permit connection with the vehicle communication unit 8. Henceforth, the electric supply communication unit 3 deems a signal transmitted from the vehicle communication unit 8 and including the vehicle ID 8a as a non-legal vehicle ID and ignores the signal. That is, the electric supply communication unit 3 discards a non-legal signal without performing an operation for the non-legal signal. In this case, the electric supply communication unit 3 and the vehicle communication unit 8 fail in establishment of a wireless connection therebetween.

In this way, the electric supply system treats only the vehicle communication unit 8 of a vehicle, which is beforehand registered with a legal key, as a legal communication partner. Therefore, the electric supply system functions to prohibit erroneous establishment of a wireless connection with a non-legal vehicle due to an erroneous determination that such a non-legal vehicle stopped in a parking lot of a next house to be a legal vehicle.

Subsequently, an operation of the control unit 55 will be described in detail. First, an operation to store electric supply condition information in the electric supply condition storage unit 54 will be described. First, a user performs a predetermined operation to register electric supply condition information in the operation unit 51. In response to the present operation, the control unit 55 causes the display unit 52 to indicate a screen to request a user to input an electric supply condition. Subsequently, a user manipulates the display unit 52 to input one or more groups of a vehicle ID and a priority. Thereby, the control unit 55 associates the inputted vehicle ID with the inputted priority in each group and stores the associated vehicle ID and priority in the electric supply condition storage unit 54.

Subsequently, an operation of the control unit 55 for charging the plug-in vehicle will be described. FIG. 4 is a diagram showing queuing data 20 and invalid box data 30. The queuing data 20 is formed by the control unit 55 in the RAM for the present operation.

The queuing data 20 stores charger entities 21 and 22 in order. Each of the charger entities 21 and 22 corresponds to one of the multiple chargers 1. Each of the charger entities 21 and 22 includes a charger ID and information on a priority of a corresponding charger. A method for generating the charger entities 21 and 22 will be described later.

The order of the charger entities 21 and 22 in the queuing data 20 is a priority of charge. One charger corresponding to the charger entity 21 on the head of the queuing data 20 is an object given with a top priority and to be connected to the electric power supply line 9. Another charger corresponding to the charger entity 22 in the second place of the queuing data 20 is an object given with the second priority and to be connected to the electric power supply line 9.

In the example of FIG. 4, two charger entities corresponding to two of the multiple chargers are stored in the queuing data 20. It is noted that the number of the charger entities in the queuing data 20 may change from zero to the total number of the chargers included in the electric supply system.

Similarly, a charger entity 31 is stored in the invalid box data 30. Dissimilarly to the queuing data 20, the stored charger entity 31 in the invalid box data 30 may be added with an order and may be excluded from an order. In the example of FIG. 4, one charger entity corresponding to one of the multiple chargers is stored in the invalid box data 30. It is noted that the number of the charger entities in the invalid box data 30 may change from zero to the total number of the chargers included in the electric supply system.

As described below, when one vehicle is connected to one of the multiple chargers 1, one charger entity corresponding to the one charger will be generated. Further, the generated one charger entity will be stored in one of the queuing data 20 and the invalid box data 30. It is determined whether a charger entity is stored in the queuing data 20 or the invalid box data 30 according to whether a priority of the charger entity is valid or invalid at the time point. Therefore, the storage location of a charger entity changes with time progress. When the one vehicle is disconnected from and the one charger, the charger entity corresponding to the one charger is deleted from the queuing data 20 or the invalid box data 30. Similarly, when the battery 7 of the one vehicle is charged full, the charger entity corresponding to the one charger is deleted from the queuing data 20.

Figure 5:
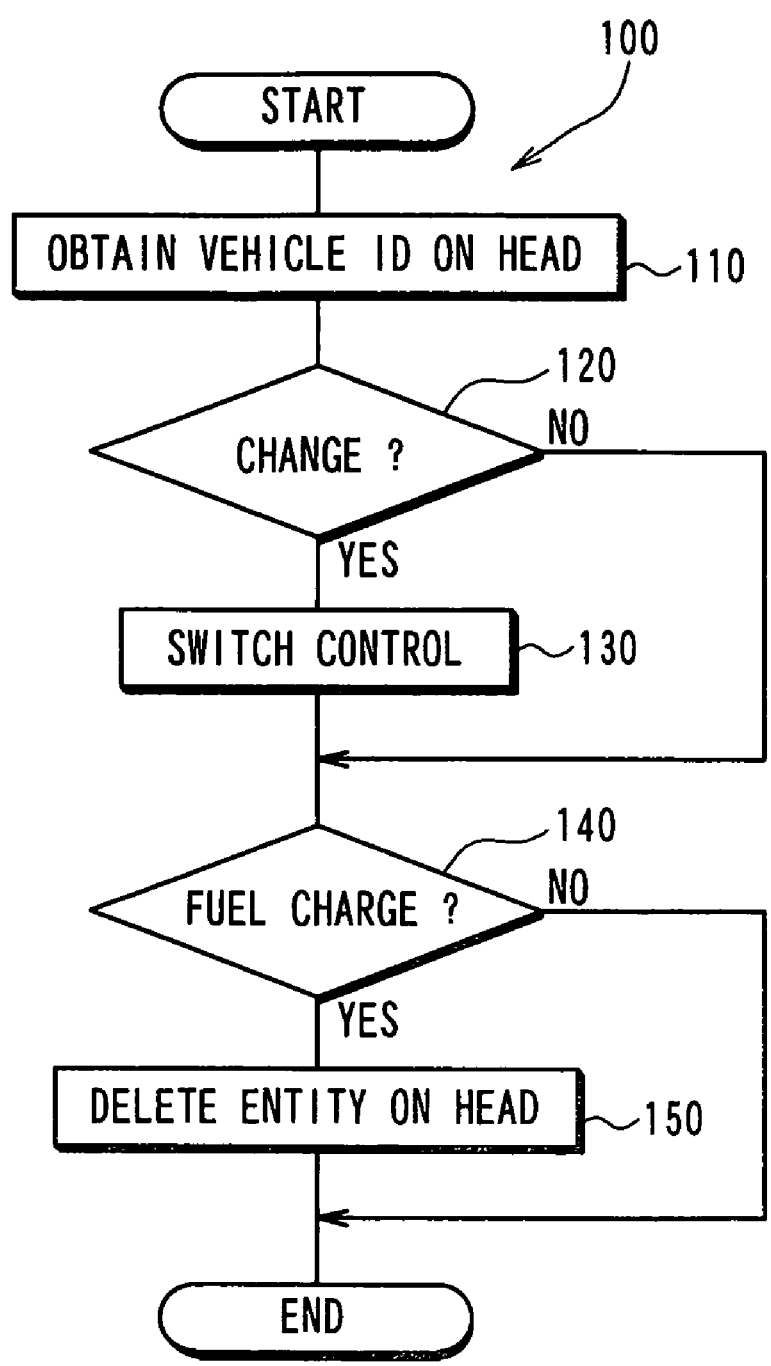
FIG. 5 is a flow chart showing a program for controlling a switching circuit according to the queuing data.
Figure 6:
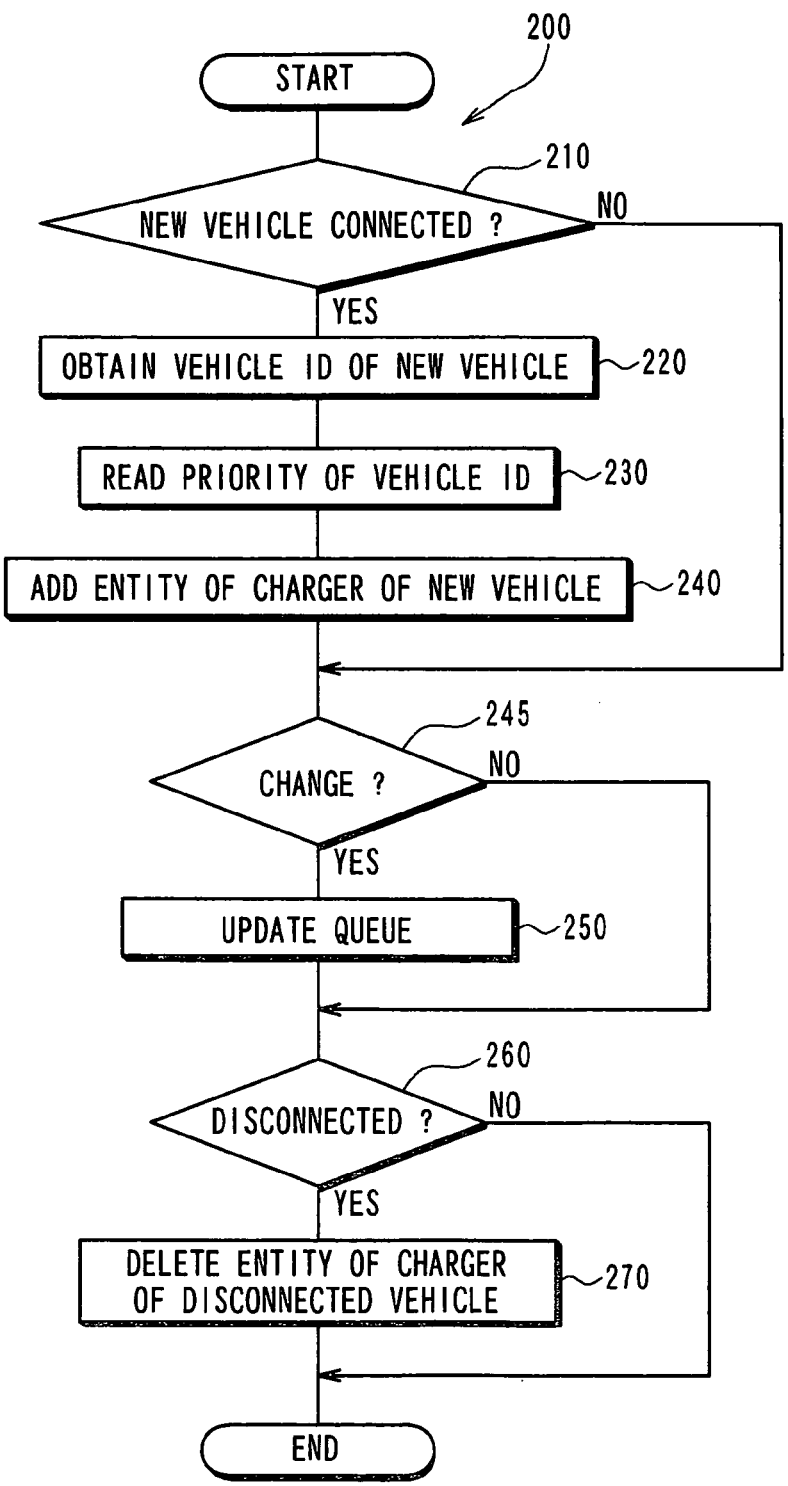
FIG. 6 is a flow chart showing a program for rewriting the queuing data and the invalid box data according to data of a electric supply condition stored in an electric supply condition storage unit.

The control unit 55 executes a program 100 shown in FIG. 5 and a program 200 shown in FIG. 6 to control charge of a plug-in vehicle using the queuing data 20 and the invalid box data 30. The program 100 shown in FIG. 5 is for a switching control to control the switching circuit 2 according to the queuing data 20. The program 200 shown in FIG. 6 is for a cue operation to rewrite the queuing data 20 and the invalid box data 30 based on data of an electric supply condition in the electric supply condition storage unit 54. The control unit 55 is configured to repeatedly execute the programs 100 and 200 in parallel.

When executing the program 100, the control unit 55 repeatedly executes operations of steps 110, 120, 140 until a charger ID of a charger entity on the head of the queuing data 20 changes or until the battery 7 presently connected to the electric power supply line 9 is charged full. When executing the program 200, the control unit 55 repeatedly executes operations of steps 210, 245, 260 until a vehicle is newly connected to one of the chargers 1, until a start time point or an end time point of a valid period of a charger entity in the queuing data 20 or the invalid box data 30, or until either of the chargers 1 is disconnected from a vehicle.

As follows, an operation of the control unit 55 according to the present embodiment caused by executing the programs 100 and the program 200 will be described in detail for multiple examples. When the electric supply system is being started, the electric power supply line 9 is connected to a non-charged connection object. The non-charged connection object is not connected to any one of the chargers of the electric supply system. For example, the non-charged connection object is a terminal, which is not electrically connected to anything other than the electric power supply line 9.

Example 1

Vehicle A Priority, Vehicle B Connected after Connection of Vehicle A

In the example 1, electric supply condition information stored in the electric supply condition storage unit 54 is in a state of FIG. 3. Specifically, a vehicle A (plug-in vehicle) is first connected to one charger P of the chargers 1. Thereafter, a vehicle B is connected to one charger Q of the chargers 1 other than the charger P, while the vehicle A is connected to the charger P. In the present example, the vehicle A is equivalent to a first vehicle, the vehicle B is equivalent to a second vehicle, the charger P is equivalent to a first charger, and the charger Q is equivalent to a second charger.

As shown in FIG. 3, the priority of the vehicle A is 2, and the priority of the vehicle B is 1. Therefore, the priority of the vehicle A is higher than the priority of the vehicle B. A valid period is not specified to the priority of each of the vehicles C and D. That is, the priority of each of the vehicles A and B is regularly valid.

Figure 7:
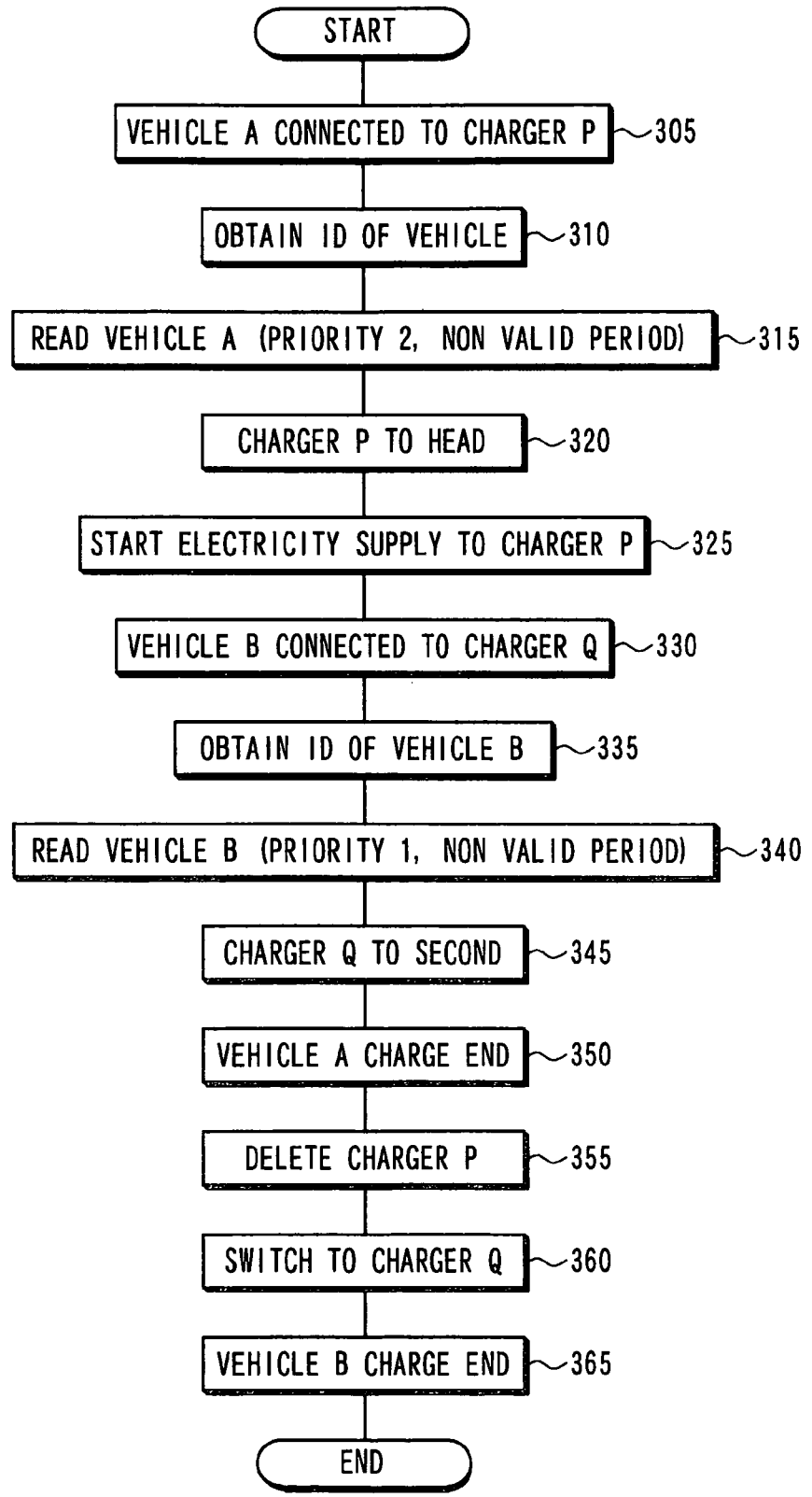
FIG. 7 is a flow chart showing a procedure to charge vehicles A and B according to an example 1.
Figure 8:
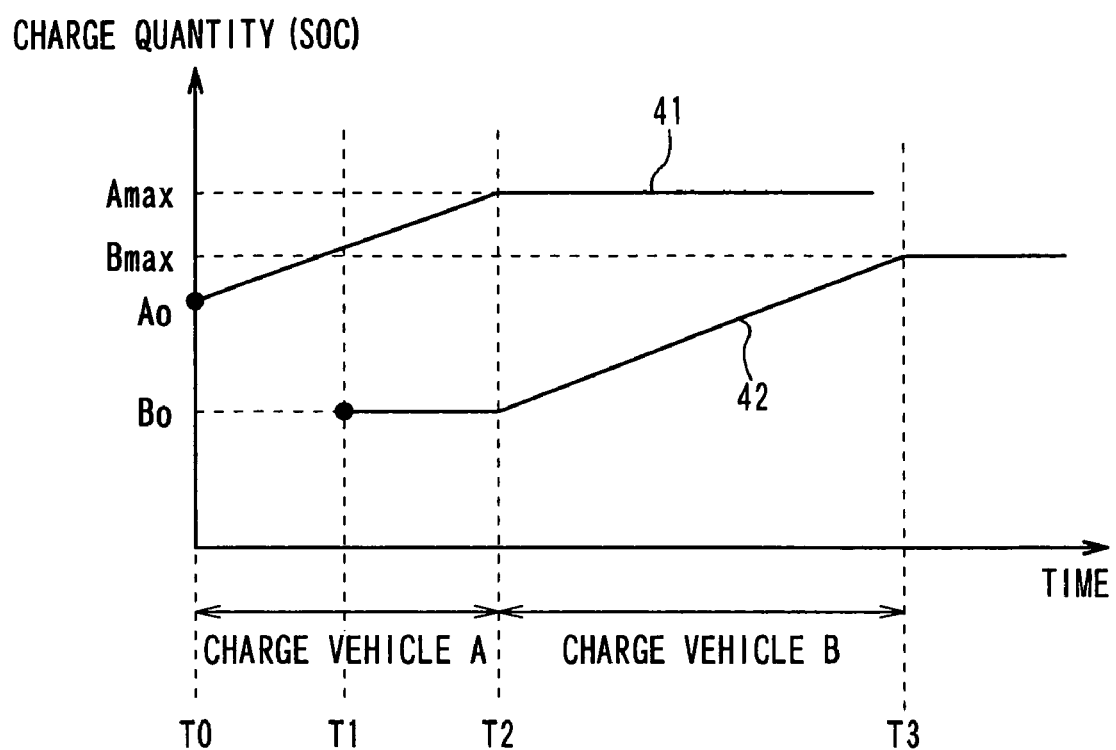
FIG. 8 is a graph showing change in a charge quantity of a battery of each of the vehicles A and B according to the example 1.

FIG. 7 is a flow chart showing a procedure to charge each of the vehicles A and B in this case. FIG. 8 is a graph showing change in a charge quantity of the battery 7 of each of the vehicles A and B with time progress. In FIG. 8, a line 41 shows a charge quantity of the battery 7 of the vehicle A, and a line 42 shows a charge quantity of the battery 7 of the vehicle B.

As follows, an operation in the example 1 will be described with reference to FIGS. 5 to 8. First, when a vehicle is not connected to any one of the chargers of the electric supply system, the number of the charger entities stored in the queuing data 20 and the invalid box data 30 is zero. In this condition, the vehicle A approaches the charger P and stops at the charger P. As described above, when the vehicle A approaches the charger P and stops at the charger P, a wireless connection is established between the vehicle communication unit 8 of the vehicle A and the electric supply communication unit 3. It is assumed that a legal key of the electric supply communication unit 3 is registered in the vehicle communication unit 8 of the vehicle A. As described above, through the wireless connection, the electric supply communication unit 3 treats the vehicle ID of the vehicle A as a legal vehicle ID.

Subsequently, at step 305 of FIG. 7, at a time T0 (FIG. 8), a user connects the vehicle A to the charger P. Thereby, the charger P detects that a plug of a power line is inserted into a plug opening of the self device and notifies the electric supply controller 5 of the detection of the insertion of the plug of the power line. In response to the notification, at step 210 of FIG. 6, the control unit 55 determines that a newly connected vehicle exists. Subsequently, the processing proceeds to step 220. At step 220 (step 310 of FIG. 7), the control unit 55 obtains a vehicle ID of the newly connected vehicle. As the vehicle ID of the newly connected vehicle, a vehicle ID of a vehicle, which has established a last wireless connection with the electric supply communication unit 3, is employed.

In a period after a wireless connection is established between the vehicle communication unit 8 of the vehicle A and the electric supply communication unit 3 before the vehicle A is connected to the charger P, another wireless connection is hardly established between the vehicle communication unit 8 of another vehicles and the electric supply communication unit 3. It is because two vehicles hardly stop simultaneously at the same parking lot. Therefore, a correct vehicle ID can be almost always obtained by employing a vehicle ID of a vehicle, which has established a last wireless connection with the electric supply communication unit 3, as the vehicle ID of the newly connected vehicle.

Subsequently, at step 230 (step 315 of FIG. 7), the control unit 55 reads information on a priority, which is associated with the obtained vehicle ID, from electric supply condition information in the electric supply condition storage unit 54. The presently read priority is 2, and a valid period is not specified.

Subsequently, at step 240, the control unit 55 generates a charger entity of the newly connected charger P according to the read information on the priority. Thus, the control unit 55 stores the generated charger entity in the queuing data 20 or the invalid box data 30. Specifically, the control unit 55 reads the charger ID of the newly connected charger P from the electric supply condition storage unit 54. Thus, the control unit 55 generates a charger entity including the charger ID and the priority, which are read from the electric supply condition storage unit 54 at step 230. That is, the charger entity of a certain charger is data including a charger ID of the certain charger and a priority of the vehicle presently connected to the certain charger.

A storage location of a generated charger entity is determined based on a priority included in a charger entity. Specifically, when a valid period is not specified in a priority included in a charger entity and when there is a blank in an order, the vehicle is deemed to be immediately charged. Thus, the charger entity is stored in the queuing data 20. In addition, when a valid period is specified in a priority included in a charger entity and when the present date is in the valid period, the vehicle is also deemed to be immediately charged. Thus, the charger entity is stored in the queuing data 20. Alternatively, when a valid period is specified in a priority included in a charger entity and when the present date is out of the valid period, the vehicle is not deemed to be immediately charged, even when there is a blank in an order. Thus, the charger entity is stored in the invalid box data 30.

An order of a charger entity in the queuing data 20 is determined based on a value of a priority included in the charger entity. Therefore, charger entities are stored in order from the top priority (head) to the lowest priority. When charger entities with the same priority exist, one of the charger entities, which is stored in the queuing data 20 earlier than the other of the charger entities, is prioritized and set to the higher side in the order.

In the present example, the control unit 55 generates a charger entity of the charger P. The priority of the charger P is the priority 2 of the vehicle A, and the charger entity is not specified with a valid period. Therefore, the control unit 55 stores the charger entity of the charger P in the queuing data 20. At the time point, the number of the charger entities is zero in the queuing data 20. Therefore, at step 320 of FIG. 7, the control unit 55 stores the charger entity of the charger P on the head in the order of the queue of the queuing data 20.

Subsequently, at step 110 of FIG. 5, the control unit 55 reads a charger ID of a charger entity on the head of the queuing data 20. Subsequently, at step 120, the control unit 55 compares the charger ID read at immediately preceding step 110 with a charger ID read at further preceding step 110. Thus, the control unit 55 determines whether the charger ID is changed. That is, the control unit 55 determines whether the charger on the head in the queuing data 20 is changed. When the charger on the head in the queuing data 20 is determined to be unchanged, the processing proceeds to step 140. Alternatively, when the charger on the head in the queuing data 20 is determined to be changed, the processing proceeds to step 130.

In the present example, a charger entity does not exist in the queuing data 20 at further preceding step 110 than immediately preceding step 110. Therefore, the presently obtained charger ID is a null value. In addition, the charger ID obtained at immediately preceding step 110 is the charger ID of the charger P. Therefore, the control unit 55 determines that the charger ID is changed. Thus, the processing proceeds to step 130.

Subsequently, at step 130, the control unit 55 performs a switching control of the switching circuit 2. Specifically, the control unit 55 controls the switching circuit 2 such that the electric power supply line 9 is to be connected to the charger P, which corresponds to the charger entity on the head in the order of the queuing data 20. Thereby, the connected destination of the electric power supply line 9 is switched to the charger P. In this manner, at step 325, charge from the charger P to the vehicle A is started through the electric power supply line 9. At the time point, a charge quantity of the battery 7 of the vehicle A is A0 (FIG. 8).

As shown by the line 41 from a time T0 to a time T1 in FIG. 8, the battery 7 of the vehicle A is charged, and the charge quantity of the battery 7 increases with time progress. Specifically, the battery 7 of the vehicle A is charged after the start of charge of the vehicle A until another vehicle is connected to another charger of the electric supply system.

In this manner, through execution of the program 100, the control unit 55 determines that the battery 7 presently being charged at step 140 is not charged full, while the charge quantity of the battery 7 increases from the time T0 to the time T1. Thus, the processing again returns to step 110, and the control unit 55 obtains the charger ID on the head in the queue. Subsequently, at step 120, the control unit 55 determines that there is no change in the charger ID. Thus, the control unit 55 repeats the operation to return to step 140. As described above, the vehicle communication unit 8 of the vehicle A repeatedly transmits information on the charge quantity of the battery 7 of the vehicle A to the legal vehicle ID. The control unit 55 determines whether the battery 7 of the vehicle A is charged full based on the information on the charge quantity received from the electric supply communication unit 3 together with the legal vehicle ID. In view of the present operation, the control unit 55 may store a charge quantity of the battery 7 of each vehicle when the battery 7 is charged full. The information on the charge quantity transmitted from the vehicle communication unit 8 may specify a rate of the present charge quantity to the charge quantity when the battery 7 is charged full.

In this manner, at step 245, the control unit 55 determines whether any one of the following conditions (1) and (2) is satisfied through execution of the program 200, while the charge quantity of the battery 7 increases from the time T0 to the time T1. When at least one of the conditions (1) and (2) is satisfied, the processing proceeds to step 250. Alternatively, when none of the conditions (1) and (2) is satisfied, the processing proceeds to step 260.

(1) The valid period of the priority of the charger entity in the queuing data 20 expires.

(2) The valid period of the priority of the charger entity in the invalid box data 30 starts.

That is, the control unit 55 determines whether validity of the priority changes with time progress. In the present example, there is no charger entity in the invalid box data 30, and a valid period is not specified to the priority of the charger entity of the charger P in the queuing data 20. Therefore, neither the conditions (1) and (2) is satisfied. Thus, the processing proceeds to step 260.

At step 260, the control unit 55 determines whether at least one connection between a charger and a vehicle is released based on a signal from each charger. When at least one connection is released, the processing proceeds to step 270. Alternatively, when no connection is released, the processing returns to step 210. In the present example, a connection is not released, and the processing returns to step 210. Further, in the present example, another vehicle is not newly connected to a charger from the time T0 to the time T1. Therefore, step 210 makes a negative determination, and the processing again proceeds to step 245. In this manner, each of steps 210, 240, 260 makes a negative determination from the time T0 to the time T1. Thereby, charge of the vehicle A is continued, while there is no change in the queuing data 20 and the invalid box data 30.

Here, it is supposed that the vehicle B approaches the charger Q and stops at the charger Q. As described above, when the vehicle B approaches the charger Q and stops at the charger Q, a wireless connection is established between the vehicle communication unit 8 of the vehicle B and the electric supply communication unit 3. It is assumed that a legal key of the electric supply communication unit 3 is registered in the vehicle communication unit 8 of the vehicle B. As described above, through the wireless connection, the electric supply communication unit 3 treats the vehicle ID of the vehicle B as a legal vehicle ID.

Subsequently, at step 330 of FIG. 7, at a time T1 (FIG. 8), a user connects the vehicle B to the charger Q. Thereby, the charger Q detects that a plug of a power line is inserted into a plug opening of the self device and notifies the electric supply controller 5 of the detection of the insertion of the plug of the power line. In response to the notification, at step 210 of FIG. 6, the control unit 55 determines that a newly connected vehicle exists. Subsequently, the processing proceeds to step 220. At step 220 (step 335 of FIG. 7), the control unit 55 obtains a vehicle ID of the newly connected vehicle, i.e., the vehicle B.

Subsequently, at step 230 (step 340 of FIG. 7), the control unit 55 reads information on a priority, which is associated with the obtained vehicle ID of the vehicle B, from electric supply condition information in the electric supply condition storage unit 54. The presently read priority is 1, and a valid period is not specified.

Subsequently, at step 240, the control unit 55 generates a charger entity of the newly connected charger Q according to the read information on the priority, similarly to the charger entity of the charger P. Thus, the control unit 55 stores the generated charger entity in the queuing data 20 or the invalid box data 30. That is, the charger entity of the charger Q is data including a charger ID of the charger Q and a priority of the vehicle B presently connected to the charger Q.

In the present example, the priority of the charger entity of the charger Q is the priority 1 of the vehicle B, and a valid period is not specified. Therefore, the charger entity of the charger Q is stored in the queuing data 20. Further at the time, the queuing data 20 only includes the charger entity of the charger P with the priority 2. Therefore, at step 345 of FIG. 7, the control unit 55 stores the charger entity of the charger Q in the second place in the order of the queuing data 20.

In the present condition, the charger entity of the charger Q is stored in the queuing data 20. Even in the present condition, there is no change in the charger ID of the charger entity on the head in the queuing data 20. Therefore, at step 120 of FIG. 5, a negative determination is made, and the switching control of step 130 is not performed. That is, charge of the vehicle A with a higher priority than that of the vehicle B continues. Charge of the vehicle B does not start at the moment. At the time T1, the charge quantity of the vehicle B is B0.

Thereafter, charge of the vehicle A continues. At the time T2 in FIG. 8, the charge quantity of the battery 7 of the vehicle A increases to Amax, and the battery 7 is charged full. Thereby, at step 140 of FIG. 5 (step 350 of FIG. 7), the control unit 55 determines that the battery 7 is charged full. Subsequently, at step 150 (step 355 of FIG. 7), the control unit 55 deletes the charger entity on the head in the queuing data 20 from the queuing data 20. In this manner, the charger entity of the charger P is deleted. Consequently, the charger entity of the charger Q becomes a charger entity on the head in the order of the queuing data 20.

At subsequent step 110, the control unit 55 obtains the charger ID of the charger Q as the charger ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 controls the switching circuit 2 such that the electric power supply line 9 is connected to the charger Q, which corresponds to the charger ID obtained at immediately preceding step 110. In this manner, at step 360 of FIG. 7, the charged object is changed to the vehicle B. Thus, charge of the vehicle B is started.

The queuing data 20 does not change unless another vehicle is connected to the charger 1. As shown by the line 42 of FIG. 8, charge of the vehicle B continues, and the charge quantity of the battery 7 increases. Finally, at step 365, at the time T3, the charge quantity of the battery 7 of the vehicle B increases to the Bmax, and the battery 7 is charged full. Thereby, at step 140, the control unit 55 determines that the battery 7 of the vehicle B is charged full. Thus, at step 150, the control unit 55 deletes the charger entity of the charger Q on the head in the queuing data 20.

At subsequent step 110, the control unit 55 obtains a null data as the charger ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 connects the electric power supply line 9 to a non-charged connection object corresponding to the null data. Thus, charge of the vehicle B is completed.

As described above, it is supposed that the first vehicle (vehicle A) is connected to the first charger (charger P), and the switching circuit 2 causes the electric power supply line 9 to be connected to the first charger (charger P). In such a condition, at the time T1 of FIG. 8, when the second vehicle (vehicle B) is newly connected to the second charger (charger Q) and when the priority assigned to the first vehicle (vehicle A) in the electric supply condition storage unit 54 is higher than the priority assigned to the second vehicle (vehicle B) in the electric supply condition storage unit 54, the control unit 55 causes the switching circuit 2 to maintain the connected destination of the electric power supply line 9 at the first charger (charger P). After charge of the vehicle A is completed at time T2, the control unit 55 causes the switching circuit 2 to switch the connected destination of the electric power supply line 9 to the charger Q, thereby starting charge of the vehicle B.

Example 2

Vehicle A Priority, Vehicle A Connected after Connection of Vehicle B

As follows, an operation of the electric supply system according to the example 2 will be described. In the present example 2, electric supply condition information shown in FIG. 3 is stored in the electric supply condition storage unit 54. The vehicle B is first connected to the charger P. Thereafter, the vehicle A is connected to the charger Q, while the vehicle B is being connected to the charger P. That is, in the present example 2, a connection order of the vehicle A and the vehicle B is different from that in the example 1. In the present example 2, the vehicle B is equivalent to a first vehicle, the vehicle A is equivalent to a second vehicle, the charger P is equivalent to a first charger, and the charger Q is equivalent to a second charger.

Figure 9:
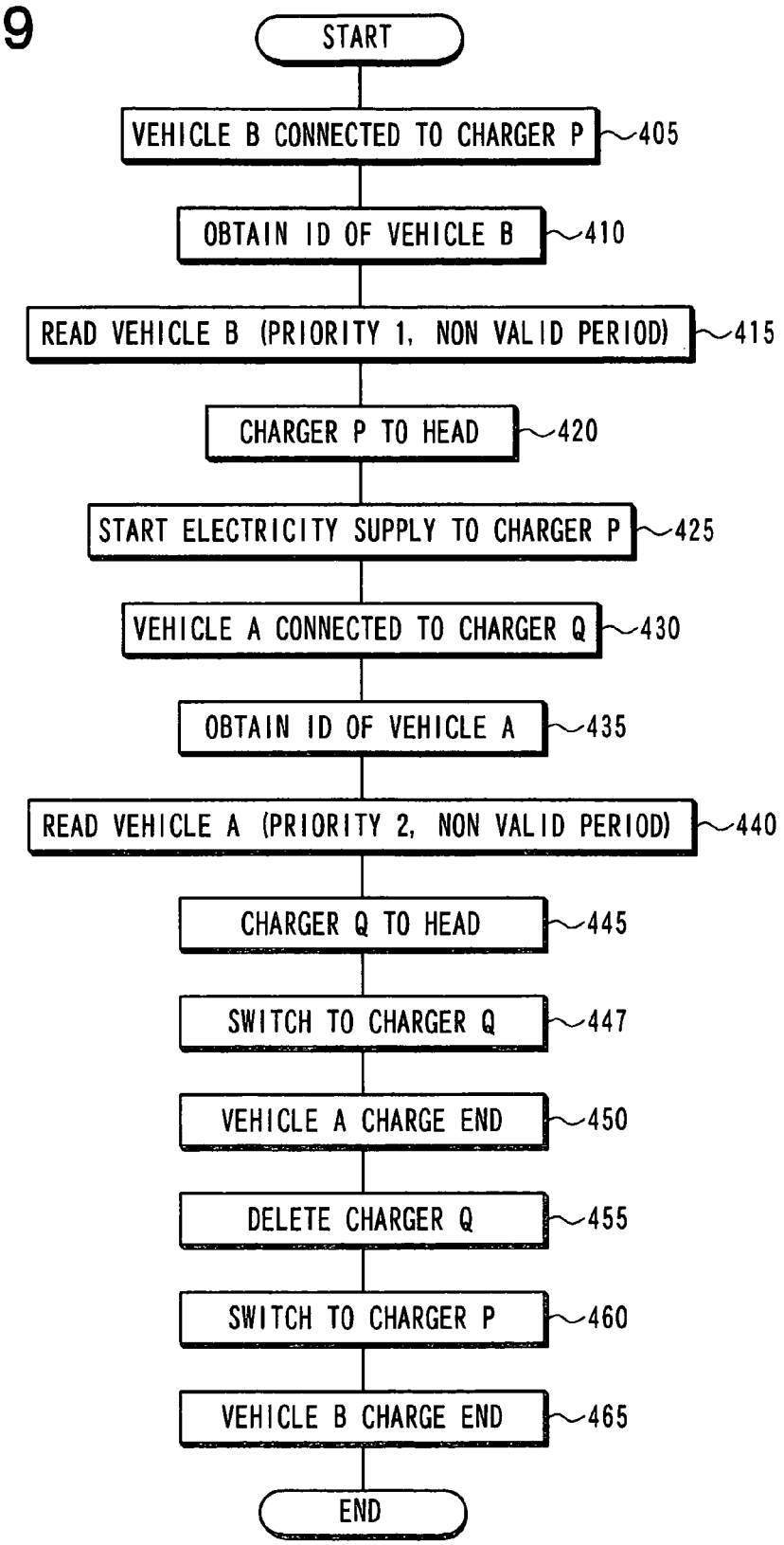
FIG. 9 is a flow chart showing a procedure to charge vehicles A and B according to an example 2.
Figure 10:
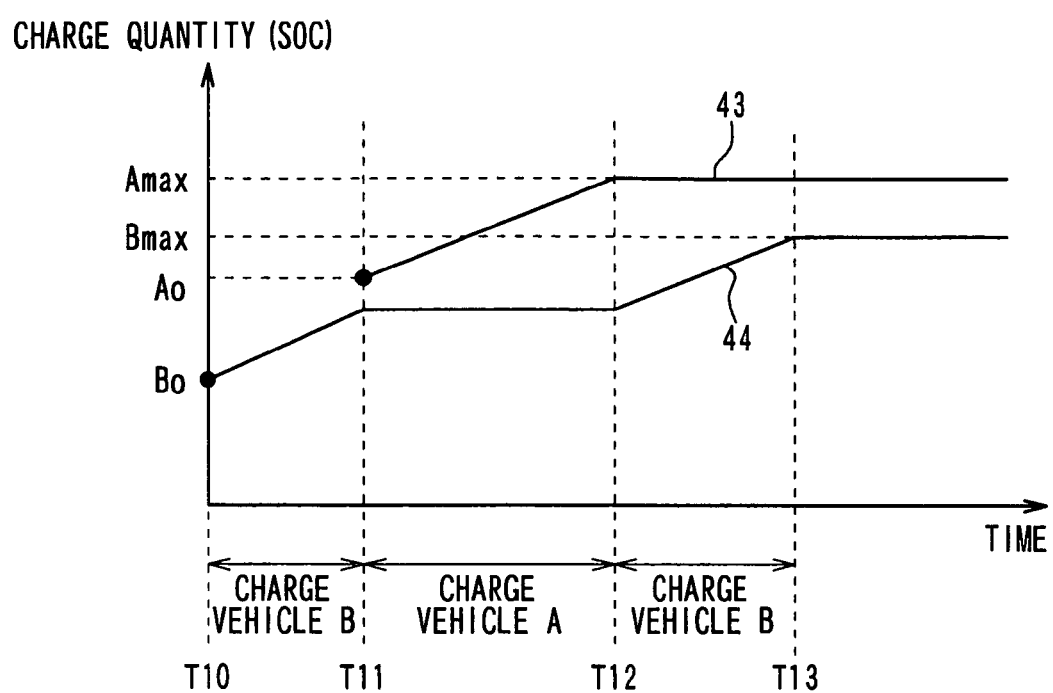
FIG. 10 is a graph showing change in a charge quantity of a battery of each of the vehicles A and B according to the example 2.

FIG. 9 is a flow chart showing a procedure to charge each of the vehicles A and B in this case. FIG. 10 is a graph showing change in a charge quantity of the battery 7 of each of the vehicles A and B with time progress. In FIG. 10, a line 43 shows a charge quantity of the battery 7 of the vehicle A, and a line 44 shows a charge quantity of the battery 7 of the vehicle B.

As follows, an operation in the example 2 will be described with reference to FIGS. 5, 6, 9, 10. First, when a vehicle is not connected to any one of the chargers of the electric supply system, the number of the charger entities stored in the queuing data 20 and the invalid box data 30 is zero. As described above, when the vehicle B approaches the charger P and stops at the charger P, a wireless connection is established between the vehicle communication unit 8 of the vehicle B and the electric supply communication unit 3. Subsequently, at step 405 of FIG. 9, at a time T10 (FIG. 10), a user connects the vehicle B to the charger P. Thereby, the charger P detects that a plug of a power line is inserted into the plug opening of the self device and notifies the electric supply controller 5 of the detection of the insertion. In response to the notification, at step 210 of FIG. 6, the control unit 55 determines that a newly connected vehicle exists. Subsequently, the processing proceeds to step 220. At step 220 (step 410 of FIG. 9), the control unit 55 obtains a vehicle ID of the newly connected vehicle. Subsequently, at step 230 (step 415 of FIG. 9), the control unit 55 reads information on a priority, which is associated with the obtained vehicle ID of the vehicle B, from electric supply condition information in the electric supply condition storage unit 54. The presently read priority is 1, and a valid period is not specified.

Subsequently, at step 240, the control unit 55 generates a charger entity of the newly connected charger P according to the read information on the priority. Thus, the control unit 55 stores the generated charger entity in the queuing data 20 or the invalid box data 30. That is, the charger entity of the charger P is data including a charger ID of the charger P and a priority of the vehicle B presently connected to the charger P.

In the present example, the priority of the charger entity of the charger P is the priority 1 of the vehicle B, and a valid period is not specified. Therefore, the charger entity of the charger P is stored in the queuing data 20. At the time point, the number of the charger entities is zero in the queuing data 20. Therefore, at step 420 of FIG. 9, the control unit 55 stores the charger entity of the charger P on the head in the order of the queue of the queuing data 20.

At step 110 of FIG. 5, the control unit 55 reads the charger ID of the charger P on the head in the queuing data 20. Subsequently, at step 120, the control unit 55 determines that the charger ID on the top in the queue is changed from the null to the charger ID of the charger P. Subsequently, at step 130, the control unit 55 performs the switching control. Specifically, the control unit 55 controls the switching circuit 2 such that the electric power supply line 9 is connected to the charger P, which corresponds to the charger ID obtained at immediately preceding step 110. In this manner, at step 425 of FIG. 9, the charged object is changed to the vehicle B. Thus, charge of the vehicle B is started.

Thereafter, any vehicle other than the vehicle B is not connected to the charger from the time T10 to the time T11 in FIG. 10, thereby there is no change in the queue. Thus, as shown by the line 44 in FIG. 10, charge of the vehicle B continues to increase the charge quantity of the battery 7 of the vehicle B.

Here, it is supposed that the vehicle A approaches the charger Q and stops at the charger Q. As described above, when the vehicle A approaches the charger Q and stops at the charger Q, a wireless connection is established between the vehicle communication unit 8 of the vehicle A and the electric supply communication unit 3. Through the wireless connection, the electric supply communication unit 3 treats the vehicle ID of the vehicle A as a legal vehicle ID.

Subsequently, at step 430 of FIG. 9, at a time T11 (FIG. 10), a user connects the vehicle A to the charger Q. Thereby, at step 210 of FIG. 6, the control unit 55 determines that a newly connected vehicle exists based on the signal from the charger Q. Subsequently, the processing proceeds to step 220. At step 220 (step 435 of FIG. 9), the control unit 55 obtains the vehicle ID of the newly connected vehicle, i.e., the vehicle A.

Subsequently, at step 230 (step 440 of FIG. 9), the control unit 55 reads information on a priority, which is associated with the obtained vehicle ID of the vehicle A, from electric supply condition information in the electric supply condition storage unit 54. The presently read priority is 2, and a valid period is not specified.

Subsequently, at step 240, the control unit 55 generates a charger entity of the newly connected charger Q according to the read information on the priority, similarly to the charger entity of the charger P. Thus, the control unit 55 stores the generated charger entity in the queuing data 20 or the invalid box data 30. That is, the charger entity of the charger Q is data including a charger ID of the charger Q and a priority of the vehicle A presently connected to the charger Q.

In the present example, the priority of the charger entity of the charger Q is the priority 2 of the vehicle A, and a valid period is not specified. Therefore, the charger entity of the charger Q is stored in the queuing data 20. Further at the time, the queuing data 20 only includes the charger entity of the charger P with the priority 1. Therefore, at step 445 of FIG. 9, the control unit 55 stores the charger entity of the charger Q on the head in the queuing data 20. Thereby, the order of the charger entity of the charger Q is moved down to the second place in the order.

At step 110 of FIG. 5, the control unit 55 reads the charger ID of the charger P on the head in the queuing data 20. Subsequently, at step 120, the control unit 55 determines that the charger ID on the top in the queue is changed from the charger ID of the charger P to the charger ID of the charger Q.

Subsequently, at step 130, the control unit 55 performs the switching control. Specifically, the control unit 55 controls the switching circuit 2 such that the electric power supply line 9 is connected to the charger Q, which corresponds to the charger ID obtained at immediately preceding step 110. In this manner, at step 447 of FIG. 9, the charged object is changed from the vehicle B to the vehicle A. Thus, charge of the vehicle A is started, and charge of the vehicle B is terminated.

Thereafter, charge of the vehicle A continues. At the time T12 in FIG. 10, the charge quantity of the battery 7 of the vehicle A increases to Amax, and the battery 7 is charged full. Thereby, at step 140 of FIG. 5 (step 450 of FIG. 7), the control unit 55 determines that the battery 7 is charged full. Subsequently, at step 150 (step 455 of FIG. 7), the control unit 55 deletes the charger entity on the head in the queuing data 20 from the queuing data 20. In this manner, the charger entity of the charger Q is deleted. Consequently, the charger entity of the charger P becomes a charger entity on the head in the order of the queuing data 20.

At subsequent step 110, the control unit 55 obtains the charger ID of the charger P as the charger ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 controls the switching circuit 2 such that the electric power supply line 9 is connected to the charger P, which corresponds to the charger ID obtained at immediately preceding step 110. In this manner, at step 460 of FIG. 9, the charged object is again changed to the vehicle B. Thus, charge of the vehicle B is started.

The queuing data 20 does not change unless another vehicle is connected to the charger 1. As shown by the line 44 of FIG. 10, charge of the vehicle B continues, and the charge quantity of the battery 7 increases. Finally, at step 465, at the time T13, the charge quantity of the battery 7 of the vehicle B increases to the Bmax, and the battery 7 is charged full. Thereby, at step 140, the control unit 55 determines that the battery 7 of the vehicle B is charged full. Thus, at step 150, the control unit 55 deletes the charger entity of the charger P on the head in the queuing data 20.

At subsequent step 110, the control unit 55 obtains a null data as the charger. ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 controls the switching circuit 2 such that the electric power supply line 9 is connected to a non-charged connection object corresponding to the null data.

As described above, it is supposed that the first vehicle (vehicle B) is connected to the first charger (charger P), and the switching circuit 2 causes the electric power supply line 9 to be connected to the first charger (charger P). In such a condition, at the time T11 of FIG. 10, when the second vehicle (vehicle A) is newly connected to the second charger (charger Q) and when the priority assigned to the second vehicle (vehicle A) in the electric supply condition storage unit 54 is higher than the priority assigned to the first vehicle (vehicle B) in the electric supply condition storage unit 54, the control unit 55 causes the switching circuit 2 to switch the connected destination of the electric power supply line 9 to the second charger (charger Q). Thereby, charge of the vehicle B is interrupted, and charge of the vehicle A is started. After charge of the vehicle A is completed at time T12, the control unit 55 causes the switching circuit 2 to switch the connected destination of the electric power supply line 9 to the charger P, thereby resuming charge of the vehicle B.

In the operations of the examples 1 and 2, it is supposed that the first vehicle is connected to the first charger and being charged. In such a condition, the second vehicle is connected to the second charger. In this case, when the first vehicle has a higher priority, charge of the first vehicle is continued. Alternatively, when the second vehicle has a higher priority, the charged destination is changed to the second vehicle, and thereby the second vehicle is charged.

Example 3

Vehicle C Priority (with Valid Period), Vehicle B Connected after Connection of Vehicle C As follows, an operation of the electric supply system according to the example 3 will be described. In the present example 3, the electric supply condition storage unit 54 stores electric supply condition information shown in FIG. 3. The vehicle C is first connected to the charger P before a late-night off-peak hours. Subsequently, the vehicle B is connected to the charger Q before the late-night off-peak hours, while the vehicle C is being connected to the charger P. Thereafter, the time elapses to be in the late-night off-peak hours. In the present example 3, the vehicle C is equivalent to a first vehicle, the vehicle B is equivalent to a second vehicle, the charger P is equivalent to a first charger, and the charger Q is equivalent to a second charger.

As shown in FIG. 3, the priority of the vehicle C is 3, and the priority of the vehicle B is 1. Therefore, the priority of the vehicle C is higher than the priority of the vehicle B. A valid period is not specified to the priority of the vehicle B, and a valid period is specified to the priority of the vehicle C. Specifically, a late-night off-peak hours is specified as a valid period to the priority of the vehicle C. The late-night off-peak hours are, for example, from 11:00 p.m. to 7:00 a.m. in the next morning. For example, a vehicle mainly used for commuting is specified with such a valid period, as exemplified by the vehicle C.

It suffices that such a vehicle mainly used for commuting is charged before leaving for working in the day after. It is noted that when charge is completed much earlier than start of actual use, the charge quantity may decrease due to self-electric discharge with time progress. Therefore, in this case, the battery is preferably charged in the late-night off-peak hours, in which an electricity bill is low, and charge of the battery is preferably prohibited in a time period before the late-night off-peak hours.

In this case, it is supposed that the battery is charged only in the late-night off-peak hours. In addition, it is supposed that there is a time after a user returns from working before the off-peak hours, in which an electricity bill is low. Even in this case, it is convenient for a user to connect the vehicle to the charger immediately after the user returns from the working, rather than waiting until the late-night off-peak hours and connecting a vehicle to a charger after start of the late-night off-peak hours.

Figure 11:
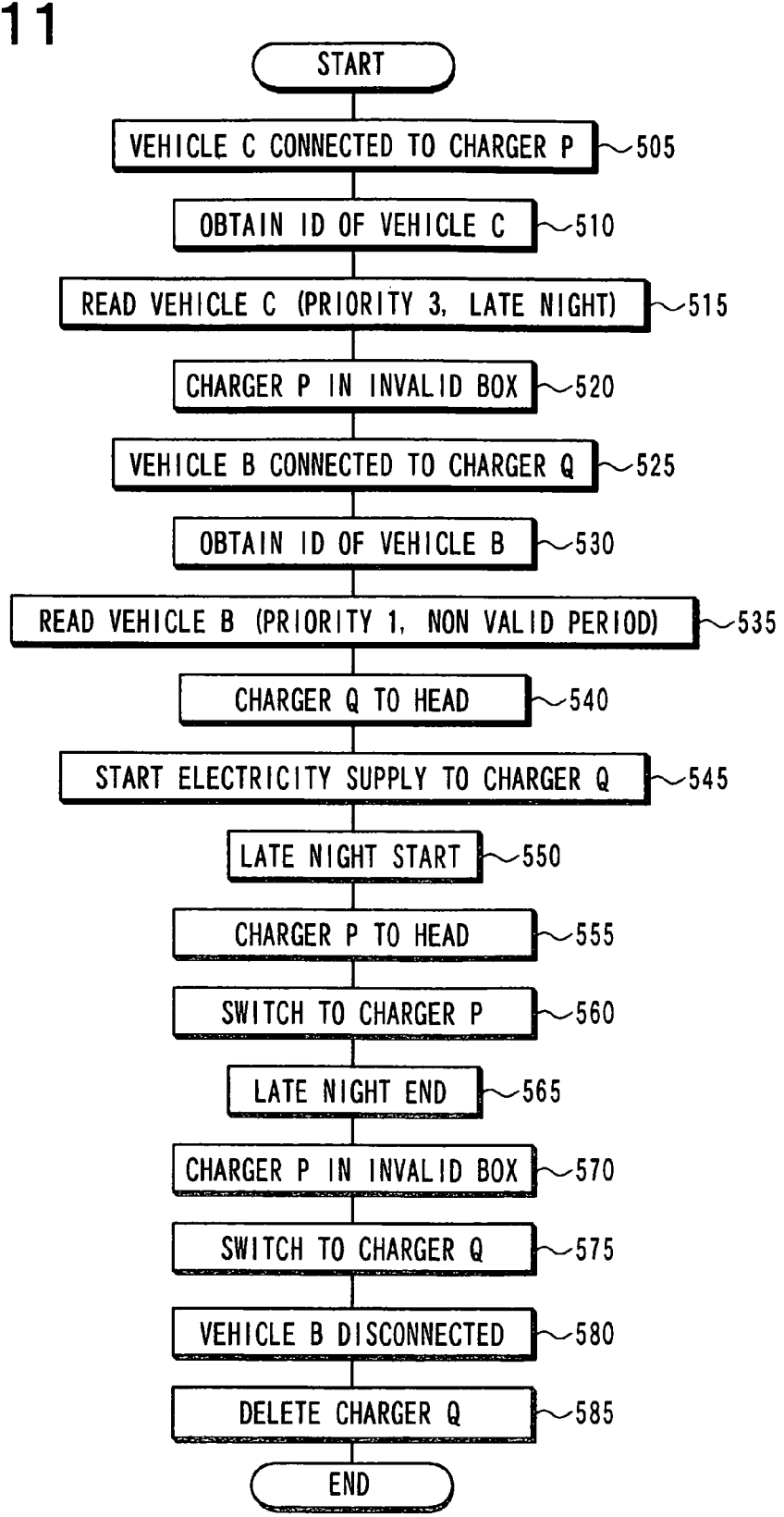
FIG. 11 is a flow chart showing a procedure to charge vehicles B and C according to an example 3.
Figure 12:
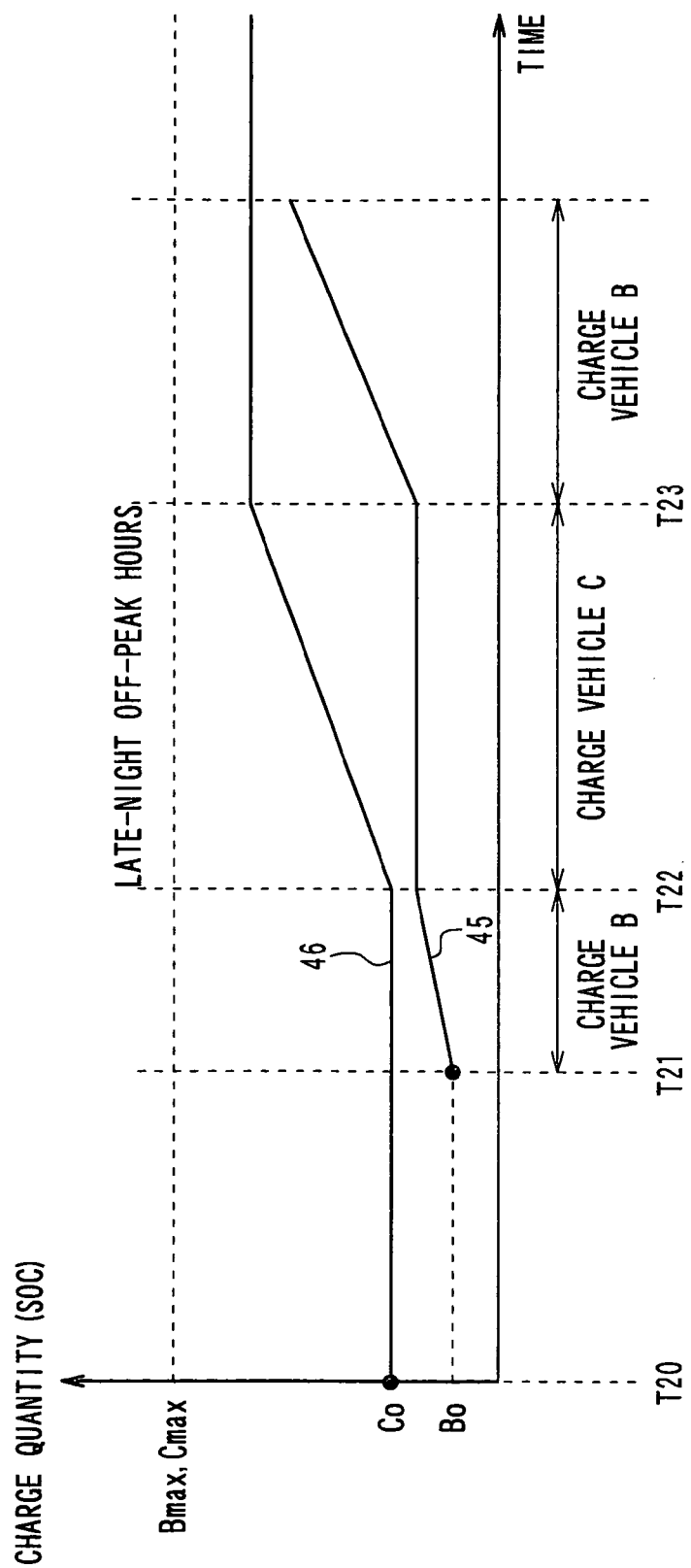
FIG. 12 is a graph showing change in a charge quantity of a battery of each of the vehicles B and C according to the example 3.

FIG. 11 is a flow chart showing a procedure to charge each of the vehicles B and C in this case. FIG. 12 is a graph showing change in a charge quantity of the battery 7 of each of the vehicles B and C with time progress. In FIG. 12, a line 45 shows a charge quantity of the battery 7 of the vehicle B, and a line 46 shows a charge quantity of the battery 7 of the vehicle C.

As follows, an operation in the example 3 will be described with reference to FIGS. 5, 6, 11, 12. First, when a vehicle is not connected to any one of the chargers of the electric supply system, the number of the charger entities stored in the queuing data 20 and the invalid box data 30 is zero. M described above, when the vehicle C approaches the charger P and stops at the charger P, a wireless connection is established between the vehicle communication unit 8 of the vehicle C and the electric supply communication unit 3.

Subsequently, at step 505 of FIG. 11, at a time T20 (FIG. 12), a user connects the vehicle C to the charger P. The time T20 is out of the late-night off-peak hours. At step 210 of FIG. 6, the control unit 55 determines that a newly connected vehicle exists based on a signal from the charger P. Subsequently, the processing proceeds to step 220. At step 220 (step 510 of FIG. 11), the control unit 55 obtains a vehicle ID of the newly connected vehicle. Subsequently, at step 230 (step 515 of FIG. 11), the control unit 55 reads information on a priority, which is associated with the obtained vehicle ID of the vehicle C, from electric supply condition information in the electric supply condition storage unit 54. The presently read priority is 3, and the valid period is specified to the late-night off-peak hours.

Subsequently, at step 240 (step 520 of FIG. 11), the control unit 55 generates a charger entity of the newly connected charger P according to the read information on the priority. Thus, the control unit 55 stores the generated charger entity in the queuing data 20 or the invalid box data 30. The charger entity of the charger P is data including a charger ID of the charger P and a priority of the vehicle C presently connected to the charger P.

In the present example, the priority of the charger entity of the charger P is the priority 3 of the vehicle C, and the valid period is specified to the late-night off-peak hours. Therefore, at the time T20, the control unit 55 stores the charger entity of the charger P in the invalid box data 30. In the present state, the queuing data 20 is still empty. Therefore, the control unit 55 repeatedly makes negative determinations at steps 120 and 140 through execution of the program 100 of FIG. 5. Consequently, the electric power supply line 9 is not connected to the charger P, and the battery 7 of the vehicle C is not charged.

Thereafter, the vehicle B approaches the charger Q and stops at the charger Q before the late-night off-peak hours, while the battery 7 of the vehicle C is not being charged. Thus, a wireless connection is established between the vehicle communication unit 8 of the vehicle B and the electric supply communication unit 3.

Subsequently, at step 525 of FIG. 11, at a time T21 (FIG. 12) before the late-night off-peak hours, a user connects the vehicle B to the charger Q. Thereby, at step 210 of FIG. 6, the control unit 55 determines that a newly connected vehicle exists based on the signal from the charger Q. Subsequently, the processing proceeds to step 220. At step 220 (step 530 of FIG. 11), the control unit 55 obtains the vehicle ID of the newly connected vehicle B.

Subsequently, at step 230 (step 535 of FIG. 11), the control unit 55 reads information on a priority, which is associated with the obtained vehicle ID of the vehicle B, from electric supply condition information in the electric supply condition storage unit 54. The presently read priority is 1, and a valid period is not specified.

Subsequently, at step 240, the control unit 55 generates a charger entity of the newly connected charger Q according to the read information on the priority, similarly to the charger entity of the charger P. Thus, the control unit 55 stores the generated charger entity in the queuing data 20 or the invalid box data 30. That is, the charger entity of the charger Q is data including a charger ID of the charger Q and a priority of the vehicle B presently connected to the charger Q.

In the present example, the priority of the charger entity of the charger Q is the priority 1 of the vehicle B, and a valid period is not specified. Therefore, the charger entity of the charger Q is stored in the queuing data 20. At the time point, the number of the charger entities is zero in the queuing data 20. Therefore, at step 540 of FIG. 11, the control unit 55 stores the charger entity of the charger Q on the head in the order of the queue of the queuing data 20.

At step 110 of FIG. 5, the control unit 55 reads the charger ID of the charger Q on the head in the queuing data 20. Subsequently, at step 120, the control unit 55 determines that the charger ID on the top in the queue is changed from the null to the charger ID of the charger Q. Subsequently, at step 130, the control unit 55 performs the switching control. Specifically, the control unit 55 controls the switching circuit 2 such that the electric power supply line 9 is connected to the charger Q, which corresponds to the charger ID obtained at immediately preceding step 110. In this manner, at step 545 of FIG. 11, charge of the vehicle B is started via the charger Q.

Thereafter, the charge of the vehicle B is continued. In the present condition, at step 550 of FIG. 11, it is supposed that the time elapses to be in the late-night off-peak hours at the time T22 of FIG. 12. At step 245 of FIG. 6, the control unit 55 determines that it is the valid period of the charger entity of the charger P in the invalid box data 30. Subsequently, the processing proceeds to step 250. At step 250, the control unit 55 updates a content in the queuing data 20 and the invalid box data 30. Specifically, the control unit 55 moves the charger entity of the charger P from the invalid box data 30 to the queuing data 20. The priority of the charger entity of the charger P is higher than the priority of the charger entity of the charger Q. Therefore, at step 555 of FIG. 11, the control unit 55 stores the charger entity of the charger P on the head in the queuing data 20. Thereby, the order of the charger entity of the charger Q is moved down to the second place in the order.

At step 120 of FIG. 5, the control unit 55 determines that the charger ID on the top in the queue is changed from the charger ID of the charger Q to the charger ID of the charger P. Subsequently, at step 130, the control unit 55 performs the switching control. Specifically, the control unit 55 controls the switching circuit 2 such that the electric power supply line 9 is connected to the charger P, which corresponds to the charger ID obtained at immediately preceding step 110. In this manner, at step 560 of FIG. 11, the charged object is changed from the vehicle B to the vehicle C. Thus, charge of the vehicle C is started, and charge of the vehicle B is terminated.

Thereafter, the charge of the vehicle C is continued. The late-night off-peak hours end at the time T23 of FIG. 12 (step 565 of FIG. 11). In the present state, at step 245 of FIG. 6, the control unit 55 determines that the valid period of the charger entity of the charger P in the queuing data 20 expires. Subsequently, the processing proceeds to step 250. At step 250, the control unit 55 updates a content of the queuing data 20 and the invalid box data 30. Specifically, at step 570 of FIG. 11, the control unit 55 moves the charger entity of the charger P from the queuing data 20 to the invalid box data 30. Thereby, the order of the charger entity of the charger Q is moved up to the head in the order.

Thereby, at step 120 of FIG. 5, the control unit 55 determines that there is a change in the obtained charger ID. Subsequently, at step 130, the control unit 55 performs the switching control. Specifically, the control unit 55 controls the switching circuit 2 such that the electric power supply line 9 is connected to the charger Q. In this manner, at step 575 of FIG. 11, the charged object is again changed to the vehicle B. Thus, charge of the vehicle C is terminated, and charge of the vehicle B is resumed.

Thereafter, at step 580 of FIG. 11, it is supposed that the vehicle B is disconnected from the charger Q before the battery 7 of the vehicle B is charged full. In this case, at step 260 of FIG. 6, the control unit 55 determines that connection between the charger Q and the vehicle is released based on a signal outputted from the charger Q. The signal outputted from the charger Q specifies that "connection is released." Subsequently, at step 270 (step 585 of FIG. 11), the control unit 55 deletes the charger entity of the charger Q from the queuing data 20 (or the invalid box data 30).

Thereby, at step 120 of FIG. 5, the control unit 55 determines that there is a change in the obtained charger ID. Subsequently, at step 130, the control unit 55 performs the switching control. Specifically, the control unit 55 controls the switching circuit 2 such that the electric power supply line 9 is connected to a non-charged connection object corresponding to the null data.

As described above, the valid period of the priority can be specified to the priority of the vehicle C, which can be stored in the electric supply condition storage unit 54. When the vehicle C is connected to the charger P and when it is out of the valid period of the priority of the vehicle C, which is from the time T20 to the time T22, the control unit 55 prohibits the connected destination of the electric power supply line 9 from being set to the charger P, irrespective of a vehicle connected to a charger other than the charger P.

Even when only one vehicle is connected to a charger, it is not necessarily preferred that the vehicle is immediately charged. For example, as described above, it is convenient for a user to connect a vehicle, which is mainly used for commuting, to a charger, immediately after the user comes back from working. In addition, charge can be performed at low cost when the vehicle is charged after starting of the late-night off-peak hours thereafter.

In consideration of that, as described above, the valid period can be set to the priority assigned to the vehicle C. Thereby, irrespective of whether another vehicle is connected to a charger other than one charger connected to the vehicle C, the one charger can be prohibited from being set to the connected destination of the electric power supply line at the time out of the valid period of the priority.

Contrary, at the time other than the late-night off-peak hours, the vehicle B, which is highly possible to be regularly used, is charged further preferentially than the vehicle C whenever being connected.

It is supposed that the first vehicle (vehicle C) is connected to the first charger (charger P), the second vehicle (vehicle B) is connected to the second charger (charger Q), the valid period is specified to the priority assigned to the first vehicle (vehicle C), and the valid period is not specified to the priority assigned to the second vehicle (vehicle B) in the electric supply condition storage unit 54. In the present state, the control unit 55 causes the switching circuit 2 to connect the electric power supply line 9 to the second charger (charger Q) when it is out of the valid period of the priority assigned to the first vehicle (vehicle C). The valid period is from the time T21 to the time T22. Thereafter, the time elapses to be in the valid period of the priority assigned to the first vehicle (vehicle C). In the present state, when the priority assigned to the first vehicle (vehicle C) is higher than the priority assigned to the second vehicle (vehicle B), the control unit 55 causes the switching circuit 2 to switch the connected destination of the electric power supply line 9 to the first charger (charger P).

It is noted that as not explicitly described in the present example, in the valid period of the priority assigned to the first vehicle (vehicle C) from the time T22 to the time T23, when the priority assigned to the second vehicle (vehicle B) is higher than the priority assigned to the first vehicle (vehicle C), the control unit 55 causes the switching circuit 2 to maintain the connected destination of the electric power supply line 9 at the second charger (charger Q).

Example 4

Vehicle D Priority (with Valid Period), Vehicle A Connected after Connection of Vehicle B As follows, an operation of the electric supply system according to the example 4 will be described. In the present example 4, the electric supply condition storage unit 54 stores electric supply condition information shown in FIG. 3. It is supposed that a vehicle D is connected to the charger P in a period other than a period from the morning to the night in a holiday. In addition, it is supposed that the vehicle B is connected to the charger Q in the nighttime in every weekday.

As shown in FIG. 3, the priority of the vehicle D is 3, and the priority of the vehicle B is 1. Therefore, the priority of the vehicle D is higher than the priority of the vehicle B. A valid period is not specified to the priority of the vehicle B, and a valid period is specified to the priority of the vehicle D. Specifically, the valid period is specified from a start time in the night immediately before a holiday, such as 7:00 p.m., to a start time in the night immediately before a weekday. For example, a vehicle mainly used in a holiday is specified with such a valid period, as exemplified by the vehicle D.

It suffices that charge of the vehicle D, which is mainly used in a holiday, is completed in the morning of a holiday. When charge of the vehicle D is completed much earlier before the morning of a holiday, the battery 7 of the vehicle D is maintained in a full charge state for a long time before its actual use. When the battery 7 of the vehicle D is charged high and continually maintained in such a state for a long time, the life of the battery 7 of the vehicle D may be lowered. Therefore, it is not desirable to complete charge of the battery 7 of the vehicle D a few or several days before a holiday. Rather, it is desirable to complete charge of the battery 7 of the vehicle D in a period from the night immediately before a holiday to the morning of the holiday. It is desirable to complete charge of the battery 7 of the vehicle D in the period from the night immediately before the holiday to the morning of the holiday. Even through, it is inconvenient for a user to wait until the night immediately before the holiday and connect the vehicle D to a charger after the waiting. That is, it is convenient for a user to connect the vehicle D to the charger immediately after parking the vehicle D, even when there are several days before the holiday.

Figure 13:
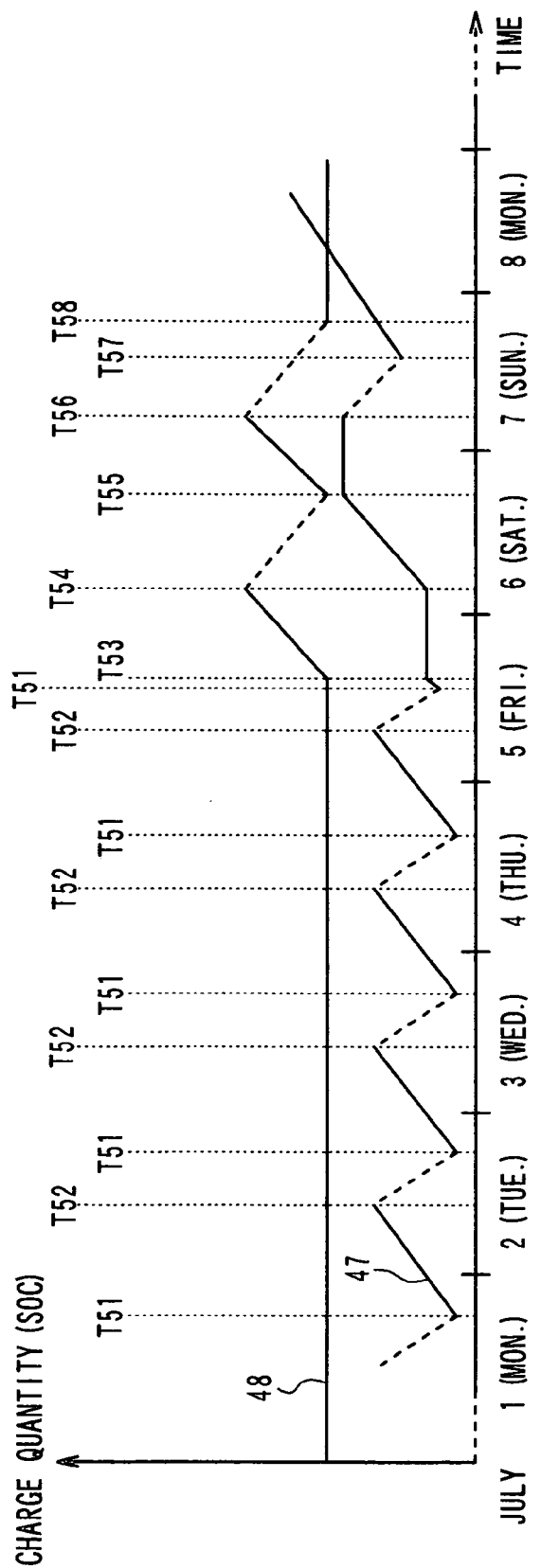
FIG. 13 is a graph showing change in a charge quantity of a battery of each of the vehicles B and D according to an example 4.

FIG. 13 is a graph showing a charge in a charge quantity of the battery 7 of each of the vehicles B and D with time progress in the present case. In FIG. 13, a line 47 shows a charge quantity of the battery 7 of the vehicle B, and a line 48 shows a charge quantity of the battery 7 of the vehicle D. The solid line portions of each of the lines 47 and 48 show a state in which the corresponding vehicle is connected to the charger. The dotted line portions of each of the lines 47 and 48 show a state in which the corresponding vehicle is disconnected from the charger and consuming electricity of the battery 7 while traveling.

As follows, an operation in the example 4 will be described with reference to FIGS. 5, 6, 13. First, the vehicle D is connected to the charger P during weekdays except for the night of a day before a holiday. The priority of the vehicle D currently stored in the electric supply condition storage unit 54 is specified in a period from a start time in the night immediately before a holiday, such as 7:00 p.m., to a start time in the night immediately before a weekday. Therefore, during this period, the charger entity of the charger P is being in the invalid box data 30 and is not moved into the queuing data 20. Thus, the electric power supply line 9 is not connected to the charger P, and the vehicle D is not charged.

On the other hand, the charge quantity of the vehicle B decreases when being used during a weekday except for the night of a day before a holiday. At the time T51 when the vehicle B is connected to charger Q, the control unit 55 generates the charger entity of the charger Q at steps 210 to 240 of FIG. 6. The priority of the charger entity is the priority of the vehicle B. Therefore, the value of the priority of the charger entity is 1, and the valid period is not specified. In this case, the charger entity of the charger Q is stored on the head of in the order of the queuing data 20. Through the operation of steps 120 and 130 of FIG. 6, the control unit 55 controls the switching circuit 2 to connect the electric power supply line 9 to the charger Q. Consequently, charge of the vehicle B is started. The charge is terminated at the time T52 when the vehicle B is disconnected from the charger Q or when the battery 7 of the vehicle B is charged full.

At the time T53, it is supposed to be the night of a day before a holiday when the vehicle B is connected to the charger Q and charged from the electric power supply line 9 through the charger Q. At step 245 of FIG. 6, the control unit 55 determines that it is the valid period of the charger entity of the charger P in the invalid box data 30. Subsequently, the processing proceeds to step 250. The control unit 55 obtains information from the clock and calendar unit 53 and determines whether the present day and the day after are a holidays or a weekday according to the obtained information.

At step 250, the control unit 55 moves the charger entity of the charger P from the invalid box data 30 to the queuing data 20. The priority 3 of the charger entity of the charger P is higher than the priority 1 of the charger entity of the charger Q. Therefore, the control unit 55 stores the charger entity of the charger P on the head in the queuing data 20. Thereby, the order of the charger entity of the charger Q is moved down to the second place in the order.

At step 120 of FIG. 5, the control unit 55 determines that the charger ID on the top in the queue is changed from the charger ID of the charger Q to the charger ID of the charger P. Subsequently, at step 130, the control unit 55 controls the switching circuit 2 such that the electric power supply line 9 is connected to the charger P. In this manner, the charged object is changed from the vehicle B to the vehicle D. Thus, charge of the vehicle D is started, and charge of the vehicle B is terminated.

Thereafter, the charge of the vehicle D is continued. At the time T54, when the vehicle D is disconnected from the charger P in the morning of the holiday, at step 260 of FIG. 6, the control unit 55 determines that the charger P is disconnected from the vehicle based on a signal outputted from the charger P. The present signal outputted from the charger P specifies that "connection is released." Subsequently, at step 270, the control unit 55 deletes the charger entity of the charger P from the queuing data 20. Thereby, the order of the charger entity of the charger Q is moved up to the head in the order of the queuing data 20. Thereby, at step 120 of FIG. 5, the control unit 55 determines that there is a change in the obtained charger ID. Subsequently, at step 130, the control unit 55 controls the switching circuit 2 such that the electric power supply line 9 is connected to the charger Q. In this manner, the charged object is changed to the vehicle B. Thus, charge of the vehicle B is resumed.

Thereafter, it is supposed that, at time T55, the vehicle D returns to the parking lot in the evening of the holiday, and the vehicle D is connected to the charger P. In this case, at step 210 of FIG. 6, the control unit 55 determines that the vehicle D is a newly connected to the charger P. Subsequently, at step 220, the control unit 55 obtains the Vehicle ID of the newly connected vehicle D. Subsequently, at step 230, the control unit 55 reads the priority of the vehicle D from the electric supply condition storage unit 54. Subsequently, at step 240, the control unit 55 generates the charger entity of charger P. The presently generated charger entity is specified with the valid period. In addition, it is presently in the valid period. Therefore, the presently generated charger entity is stored in the queuing data 20. Furthermore, the priority of the presently generated charger entity of the charger P is higher than the priority of the charger entity of the charger Q. Therefore, the charger entity of the charger P is stored on the head of the queuing data 20. Thus, the charger entity of the charger Q is moved down to the second place in the order.

Thereby, at step 120 of FIG. 5, the control unit 55 determines that there is a change in the obtained charger ID. Subsequently, at step 130, the control unit 55 controls the switching circuit 2 such that the electric power supply line 9 is connected to the charger P. In this manner, the charged object is changed to the vehicle D. Thus, charge of the vehicle D is started, and charge of the vehicle B is terminated.

Thereafter, at time T56 in the morning of the second holiday, it is supposed that both the vehicles B and D are disconnected from the corresponding chargers. In this case, at step 260 of FIG. 6, the control unit 55 determines that connections between the chargers P, Q and the vehicles are released based on signals outputted from the chargers P, Q. The signals outputted from the chargers P, Q specify that "connections are released." Subsequently, at step 270, the control unit 55 deletes the charger entities of the chargers P, Q from the queuing data 20. Consequently, the queuing data 20 becomes empty. Thereby, at step 120 of FIG. 5, the control unit 55 determines that there is a change in the obtained charger ID. Subsequently, at step 130, the electric power supply line 9 is connected to the non-charged connection object corresponding to the null data. Thus, the charge of the vehicles B and D is terminated.

Thereafter, at the time T57 in the second holiday, it is supposed that the vehicle B first returns to the parking lot, and the vehicle B is connected to the charger Q. In this case, at steps 210 to 240 of FIG. 6, the control unit 55 generates the charger entity of the charger Q. The priority of the charger entity is the priority of the vehicle B, and the valid period is not specified. In this case, the queuing data 20 at the time point is empty. Therefore, the charger entity of the charger Q is stored on the head of in the order of the queuing data 20. Through the operation of steps 120 and 130 of FIG. 6, the control unit 55 controls the switching circuit 2 to connect the electric power supply line 9 to the charger Q. Consequently, charge of the vehicle B is started.

Thereafter, at the time T58 of the night in the second holiday, it is supposed that the vehicle D returns to the parking lot, and the vehicle D is connected to the charger P. In this case, at steps 210 to 240 of FIG. 6, the control unit 55 generates the charger entity of the charger P. The priority of the charger entity is the priority of the vehicle D, and the valid period is specified. In the present example, the second holiday is the day before a weekday. Therefore, the time T58 in the nighttime of the second holiday is out of the valid period.

Thus, the charger entity of the charger P is stored in the invalid box data 30, and charge of vehicle B is continued.

As described above, the valid period of the priority can be specified to the priority of the vehicle D, which can be stored in the electric supply condition storage unit 54. When the vehicle D is connected to the charger P and when it is out of the valid period of the priority of the vehicle D, which is from the time T51 to the time T53, the control unit 55 prohibits the connected destination of the electric power supply line 9 from being set to the charger P, irrespective of a vehicle connected to a charger other than the charger P.

Even when only one vehicle is connected to a charger, it is not necessarily preferred that the vehicle is immediately charged. For example, as described above, it is convenient for a user to connect a vehicle, which is mainly used in a holiday, to a charger, immediately after the vehicle is parked. In addition, charge can be performed at low cost when the vehicle is charged in the day before a holiday thereafter.

In consideration of that, as described above, the valid period can be set to the priority assigned to the vehicle D. Thereby, irrespective of whether another vehicle is connected to a charger other than one charger connected to the vehicle D, the one charger can be prohibited from being set to the connected destination of the electric power supply line at the time out of the valid period of the priority.

A combination of a vehicle and a charger does not affect the above-described operation. That is, the order of a vehicle to be charged is determined by the priority associated to each vehicle. The order of the vehicles to be charged is not determined by which charger is connected to each vehicle.

Furthermore, in the examples, the control unit 55 causes the display unit 52 to indicate the vehicle ID of the vehicle and information on the charge quantity of the battery 7 of the vehicle when receiving information on the vehicle ID and the charge quantity from the vehicle communication unit 8 of each vehicle, which is connected to a charger, through the electric supply communication unit 3. Thus, a user can obtain the charge quantity of the battery 7 even when being in the house 4.

In this case, in addition to the charge quantity or instead of the charge quantity, the control unit 55 may cause the display unit 52 to indicate an expected traveling distance corresponding to the charge quantity. The expected traveling distance corresponding to a certain charge quantity is an expected value of a total distance, by which the vehicle with the certain charge quantity of the battery 2 can travel before the charge quantity of the battery 7 becomes zero, without additional charge of the battery 7. The expected traveling distance is, for example, a value obtained by dividing the charge quantity by a power consumption rate. The power consumption rate is an electric energy of the battery 2, by which the vehicle consumes when traveling for a unit travel distance. The power consumption rate may be a fixed value or may be inputted by a user using the operation unit 51 in each vehicle.

Second Embodiment

Subsequently, the second embodiment will be described. Mainly, the difference of the second embodiment from the first embodiment will be described in detail. Specifically, in the present second embodiment, a priority is not associated with each vehicle but associated with each charger. Thus, the priority of charge is determined according to the priorities of the chargers.

The structure of the electric supply system of the present embodiment is substantially equivalent to that of the first embodiment. Dissimilarly to the first embodiment, the prior- ity of the electric supply condition information stored in the electric supply condition storage unit 54 of the electric supply controller 5 is associated not to each vehicle ID but to the charger ID of each charger. A valid period can be arbitrarily specified to a priority, similarly to the first embodiment.

FIG. 14 shows one example of electric supply condition information stored in the electric supply condition storage unit 54 according to the present second embodiment. In the present one example of the electric supply condition information, information on a priority is associated to each of four chargers P, Q, R, S of the multiple chargers 1 of the electric supply system. Specifically, priorities of 2, 1, 3, 3 are respectively assigned to the charger IDs of the chargers P, Q, R, S. A valid period is not specified to the priority of each of the chargers P and Q. In the present example, the priority of each of the chargers P and Q is regularly valid. Contrary, a valid period is specified to the priority of each of the chargers R and S. In the present example, the priority of each of the chargers R and S is valid only in the specified valid period.

Figure 15:
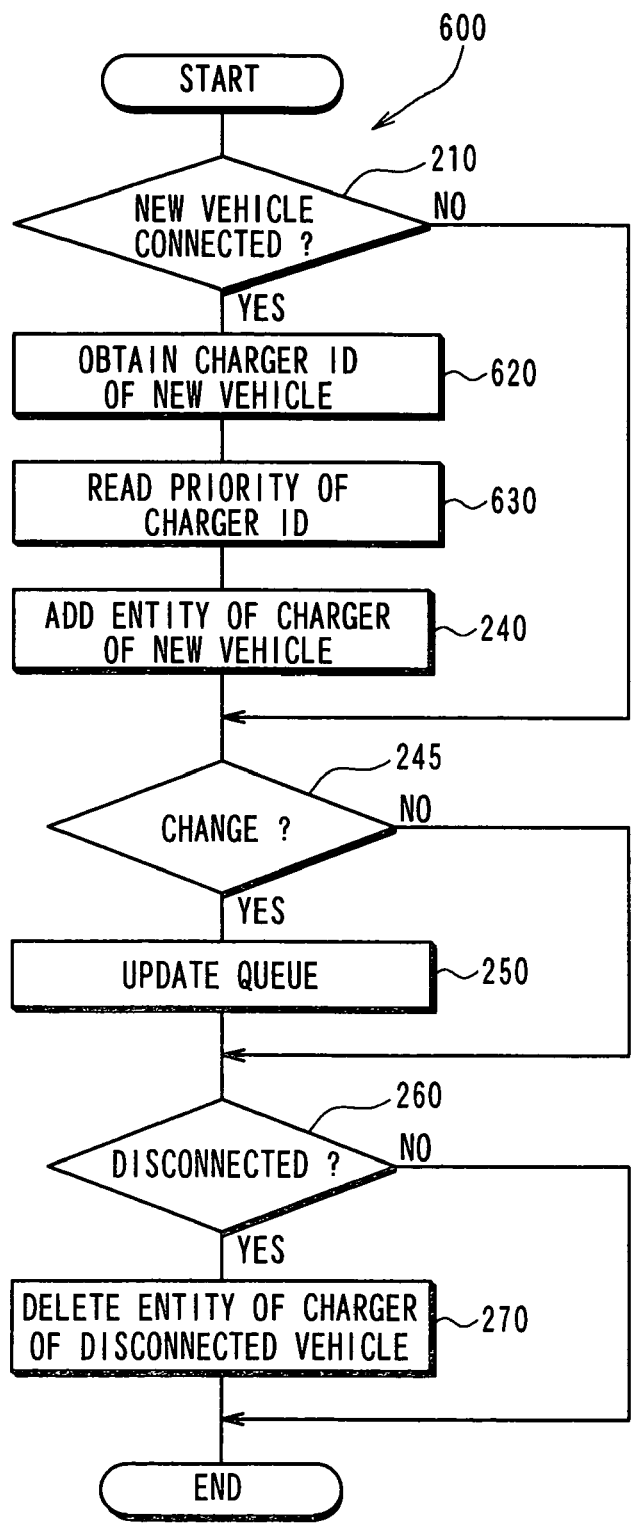
FIG. 15 is a flow chart showing a program for rewriting the queuing data and the invalid box data according to the second embodiment.

The control unit 55 is configured to execute the program 100 shown in FIG. 5, similarly to the first embodiment. Further, the control unit 55 is configured to execute a program 600 shown in FIG. 15, instead of the program 200 shown in FIG. 6. The control unit 55 is configured to repeatedly execute the programs 100 and 600 in parallel. The elements specified by the same reference numerals in FIGS. 6, 15 have functions equivalent to each other.

As follows, an operation of the control unit 55 according to the present embodiment caused by executing the programs 100 and the program 600 will be described in detail for one example. Similarly to the first embodiment, when the electric supply system is being started, the electric power supply line 9 is connected to a non-charged connection object.

Example 5

Charger P Priority, Charger P Connected after Connection of Charger Q

In the present example 5, electric supply condition information shown in FIG. 14 is stored in the electric supply condition storage unit 54. A plug-in vehicle B is first connected to the charger Q. Thereafter, the vehicle A is connected to the charger P, while the vehicle B is being connected to the charger Q. Therefore, in the present example, the charger Q is equivalent to a first charger, and the charger P is equivalent to a second charger.

Figure 16:
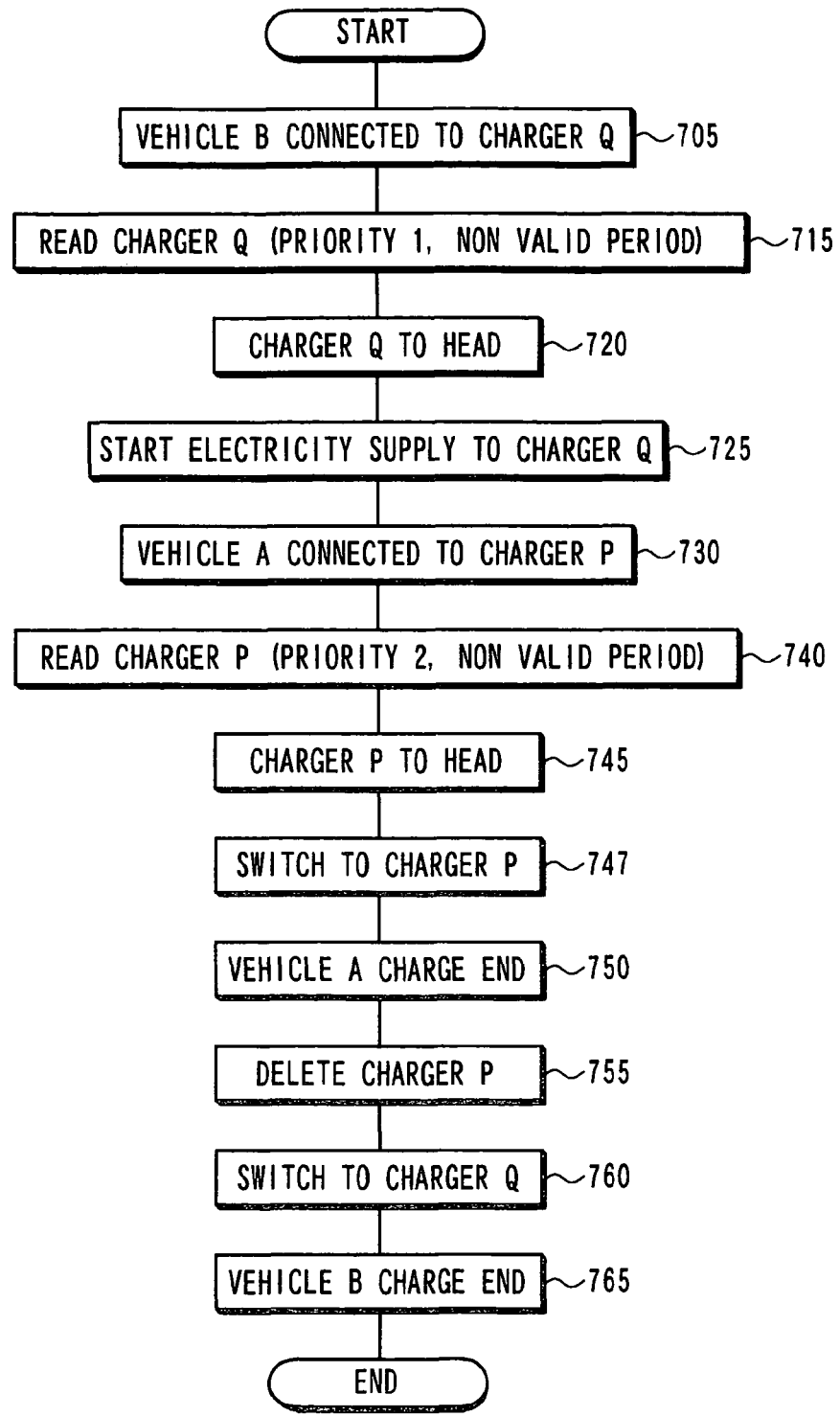
FIG. 16 is a flow chart showing a procedure to charge vehicles A and B according to an example 5.
Figure 17:
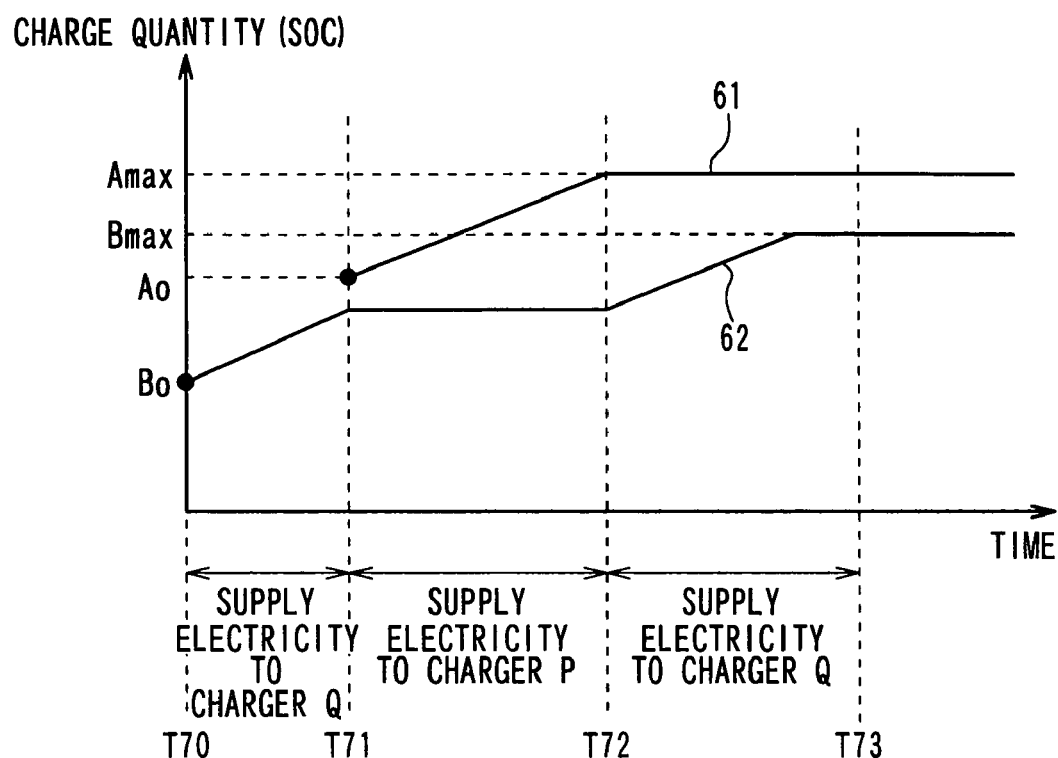
FIG. 17 is a graph showing change in a charge quantity of a battery of each of the vehicles A and B according to the example 5.

FIG. 16 is a flow chart showing a procedure to charge each of the vehicles A and B in this case. FIG. 17 is a graph showing change in a charge quantity of the battery 7 of each of the vehicles A and B with time progress. In FIG. 17, a line 61 shows a charge quantity of the battery 7 of the vehicle A, and a line 62 shows a charge quantity of the battery 7 of the vehicle B.

As follows, an operation in the example 5 will be described with reference to FIGS. 5, 15, 16, 17. First, when a vehicle is not connected to any one of the chargers of the electric supply system, the number of the charger entities stored in the queuing data 20 and the invalid box data 30 is zero. As described above, when the vehicle B approaches the charger Q and stops at the charger Q, a wireless connection is established between the vehicle communication unit 8 of the vehicle B and the electric supply communication unit 3.

Subsequently, at step 705 of FIG. 16, at a time T70 (FIG. 17), a user connects the vehicle B to the charger Q. Thereby, the charger Q detects that a plug of a power line is inserted into a plug opening of the self device and notifies the electric supply controller 5 of the detection of the insertion of the plug of the power line. In response to the notification, at step 210 of FIG. 15, the control unit 55 determines that a vehicle newly connected to the charger Q exists. Subsequently, the processing proceeds to step 620. At step 620, the control unit 55 obtains a charger ID of the charger Q, which is newly connected to the vehicle, from the electric supply condition storage unit 54.

Subsequently, at step 630 (step 715 of FIG. 16), the control unit 55 reads information on a priority, which is associated with the obtained charger ID, from electric supply condition information on the electric supply condition storage unit 54. The presently read priority is 1, and a valid period is not specified.

Subsequently, at step 240, the control unit 55 generates a charger entity of the newly connected charger Q according to the read information on the priority. Thus, the control unit 55 stores the generated charger entity in the queuing data 20 or the invalid box data 30. That is, the charger entity of the charger Q is data including a charger ID of the charger Q and a priority of the charger Q.

Specifically, in the generated charger entity of the charger Q, the priority is 1, and a valid period is not specified. Therefore, the charger entity of the charger Q is stored in the queuing data 20. At the time point, the number of the charger entities is zero in the queuing data 20. Therefore, at step 720 of FIG. 16, the control unit 55 stores the charger entity of the charger Q on the head in the order of the queue of the queuing data 20.

At step 110 of FIG. 5, the control unit 55 reads the charger ID of the charger Q on the head in the queuing data 20. Subsequently, at step 120, the control unit 55 determines that the charger ID on the top in the queue is changed from the null to the charger ID of the charger Q. Subsequently, at step 130, the control unit 55 performs the switching control. Specifically, the control unit 55 controls the switching circuit 2 such that the electric power supply line 9 is connected to the charger Q, which corresponds to the charger ID obtained at immediately preceding step 110. In this manner, at step 725 of FIG. 16, the charged object is changed to the vehicle B. Thus, charge of the vehicle B through the charger Q is started.

Thereafter, any vehicle other than the vehicle B is not connected to the charger from the time T70 to the time T71 in FIG. 17, thereby there is no change in the queue. Thus, as shown by the line 62 in FIG. 17, charge of the vehicle B continues to increase the charge quantity of the battery 7 of the vehicle B.

Here, it is supposed that the vehicle A approaches the charger P and stops at the charger P. As described above, when the vehicle A approaches the charger P and stops at the charger P, a wireless connection is established between the vehicle communication unit 8 of the vehicle A and the electric supply communication unit 3.

Subsequently, at step 730 of FIG. 16, at a time T71 (FIG. 17), a user connects the vehicle A to the charger P. At step 210 of FIG. 15, the control unit 55 determines that a vehicle, which is newly connected to the charger P, exists based on a signal from the charger P. Subsequently, the processing proceeds to step 620. At step 620, the control unit 55 obtains the charger ID of the charger P.

Subsequently, at step 630 (step 740 of FIG. 16), the control unit 55 reads information on a priority, which is associated with the obtained charger ID of the charger P, from electric supply condition information on the electric supply condition storage unit 54. The presently read priority is 2, and a valid period is not specified.

Subsequently, at step 240, the control unit 55 generates a charger entity of the newly connected charger P according to the read information on the priority. Thus, the control unit 55 stores the generated charger entity in the queuing data 20 or the invalid box data 30. That is, the charger entity of the charger P is data including the charger ID of the charger P and the priority of the charger P.

In the present example, the priority of the charger entity of the charger P is 2, and a valid period is not specified. Therefore, the charger entity of the charger P is stored in the queuing data 20. Further at the time, the queuing data 20 includes the charger entity of the charger Q with the priority 1. Therefore, at step 745 of FIG. 16, the control unit 55 stores the charger entity of the charger P on the head in the queuing data 20. Thereby, the order of the charger entity of the charger Q is moved down to the second place in the order.

At step 110 of FIG. 5, the control unit 55 reads the charger ID of the charger P on the head in the queuing data 20. Subsequently, at step 120, the control unit 55 determines that the charger ID on the top in the queue is changed from the charger ID of the charger Q to the charger ID of the charger P. Subsequently, at step 130, the control unit 55 performs the switching control. Specifically, the control unit 55 controls the switching circuit 2 such that the electric power supply line 9 is connected to the charger P, which corresponds to the charger ID obtained at immediately preceding step 110. In this manner, at step 747 of FIG. 16, the charged object is changed from the vehicle B to the vehicle A. Thus, charge of the vehicle A through the charger P is started.

Thereafter, charge of the vehicle A continues. At the time T72 in FIG. 17, the charge quantity of the battery 7 of the vehicle A increases to Amax, and the battery 7 is charged full. Thereby, at step 140 of FIG. 5 (step 750 of FIG. 16), the control unit 55 determines that the battery 7 is charged full. Subsequently, at step 150 (step 755 of FIG. 16), the control unit 55 deletes the charger entity on the head in the queuing data 20 from the queuing data 20. In this manner, the charger entity of the charger P is deleted. Consequently, the charger entity of the charger Q becomes a charger entity on the head in the order of the queuing data 20.

At subsequent step 110, the control unit 55 obtains the charger ID of the charger Q as the charger ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 controls the switching circuit 2 such that the electric power supply line 9 is connected to the charger Q, which corresponds to the charger ID obtained at immediately preceding step 110. In this manner, at step 760 of FIG. 16, the charged object is again changed to the vehicle B. Thus, charge of the vehicle B is started.

The queuing data 20 does not change unless another vehicle is connected to the charger 1. As shown, by the line 62 of FIG. 17, charge of the vehicle B continues, and the charge quantity of the battery 7 increases. Finally, at step 765, at the time T73, the charge quantity of the battery 7 of the vehicle B increases to the Bmax, and the battery 7 is charged full. Thereby, at step 140, the control unit 55 determines that the battery 7 of the vehicle B is charged full. Thus, at step 150, the control unit 55 deletes the charger entity of the charger Q on the head in the queuing data 20.

At subsequent step 110, the control unit 55 obtains a null data as the charger ID of the charger entity on the head in the queuing data 20. Subsequently, the control unit 55 determines that there is a change in the obtained charger ID at step 120. Subsequently, at step 130, the control unit 55 performs the switching control. Specifically, the control unit 55 controls the switching circuit 2 such that the electric power supply line 9 is connected to a non-charged connection object corresponding to the null data.

In the present example, the priority of the second charger (charger P) is beforehand set to be higher than the priority of the first charger (charger Q) in the electric supply condition storage unit 54. In addition, it is supposed that the electric power supply line 9 is connected to the first charger (charger Q), to which the vehicle B is being connected, and the second charger (charger P) is connected to another vehicle A. In this case, the control unit 55 switches the electricity supplied destination (charged destination) of the switching circuit 2 to the second charger (charger P).

More specifically, it is supposed that the vehicles are simultaneously connected to each of the chargers P and Q. In this case, the control unit 55 controls the switching circuit 2 such that the electric power supply line 9 is connected to the one charger P, which is assigned with the highest priority in the electric supply condition storage unit 54.

There is a tendency to determine a priority of each of multiple chargers. Specifically, there is a demand to use a certain charger of multiple chargers to charge one battery with the highest priority and to use another charger of the multiple chargers to charge another battery with a lower priority.

In order to satisfy such a demand, as described above, priorities are respectively set to the multiple chargers. In addition, the control unit 55 controls the connected destination, i.e., the electricity supplied destination of the electric power supply line 9 in the order according to the priority. In this manner, such a demand to determine the priority of charge of each of the chargers is satisfied. Thereby, convenience of a user of a vehicle can be enhanced.

In the example, at step 745, when a higher priority is assigned to the charger Q than the priority of the charger P in the electric supply condition storage unit 54, the charger P is stored in the second place in the queuing data 20. Thereafter, charge of the vehicle B through the charger Q is continued until the battery 7 of the vehicle B is charged full.

It is supposed that the vehicle B is connected to the charger R or S, and it is out of the valid period of the priority assigned to the charger R or S, to which the vehicle B is connected, in the electric supply condition storage unit 54 at the time point. In this case, irrespective of whether another vehicle is connected to a charger other than the chargers R and S, the control unit 55 prohibits the connected destination of the electric power supply line 9 from being set to the charger R or S, to which the vehicle B is connected.

More specifically, it is supposed that the vehicle B is connected to the first charger (charger R or S), and anther vehicles A is connected to the second charger (charger P). In addition, in the electric supply condition storage unit 54, a valid period is specified to a priority assigned to the first charger (charger R or S), and a valid period is not specified to a priority assigned to the second charger (charger P). In this case, when it is out of the valid period of the priority assigned to the first charger (charger R or S), the control unit 55 causes the switching circuit 2 to connect the electric power supply line 9 to the second charger (charger P). Thereafter, it is supposed to be in the valid period of the priority assigned to the first charger (charger R or S). In this case, when the priority assigned to the first charger (charger R or S) is higher than the priority assigned to the second charger (charger P), the control unit 55 causes the switching circuit 2 to switch the connected destination of the electric power supply line 9 to the first charger (charger R or S). Alternatively, when the priority assigned to the second charger (charger P) is higher than the priority assigned to the first charger (charger R or S), the control unit 55 causes the switching circuit 2 to maintain the connected destination of the electric power supply line 9 at the second charger (charger P).

The present inventor noted that even when only one vehicle is connected to a charger, a user does not necessarily demand to charge the vehicle immediately. For example, as described above, a vehicle used for commuting and a vehicle mainly used in a holiday may coincide with the present assumption. In order to satisfy such a demand, as described above, a valid period may be specified to a priority assigned to the charger R or S. In this case, when it is out of the valid period of the priority, the control unit 55 can prohibit a connected destination of the electric power supply line to be set to the charger R or S, irrespective whether another vehicle is connected to another charger. Therefore, it suffices that a user connects a vehicle to the charger R or S to charge the vehicle only in the valid period.

A combination of a vehicle and a charger does not affect the above-described operation. That is, the order of a vehicle to be a connected destination of the electric power supply line 9 is determined only by the priority associated to each vehicle. The order of a vehicle to be a connected destination of the electric power supply line 9 is not determined by which charger is connected to each vehicle.

Furthermore, in the example, the control unit 55 causes the display unit 52 to indicate the vehicle ID of the vehicle and information on the charge quantity of the battery 7 of the vehicle when receiving information on the vehicle ID and the charge quantity from the vehicle communication unit 8 of each vehicle, which is connected to a charger, through the electric supply communication unit 3. Thus, a user can obtain the charge quantity of the battery 7 even when being in the house 4. In this case, in addition to the charge quantity or instead of the charge quantity, the control unit 55 may cause the display unit 52 to indicate an expected traveling distance corresponding to the charge quantity.

In the present embodiment, the plug-in vehicle 6 need not include the vehicle communication unit 8. Alternatively, even when the plug-in vehicle 6 includes the vehicle communication unit 8, the vehicle communication unit 8 need not transmit a vehicle ID. Since, the control unit 55 does not use the vehicle ID to determine a charger to be a connected destination of the electric power supply line 9. In this case, the control unit 55 need not to indicate the vehicle ID and the charge quantity on the display unit 52.

Other Embodiment

As described above, although the embodiment has been described, the scope of the present invention is not limited to the embodiment. The scope of the present invention includes various forms, which can produce a function of each subject matter of the present invention.

For example, in the first embodiment, when charger entities with the same priority are stored in the queuing data 20, one charger entity stored in the queuing data 20 earlier than the other charger entity is assigned with a higher priority, i.e., stored in the higher place in the order of the queuing data 20. The order of the charger entity may not be determined in this manner. For example, when the charger entities with the same priority are stored in the queuing data 20, the control unit 55 may change the order of the charger entities in a round manner in the queuing data 20 at a regular interval.

Specifically, for example, it is supposed that only two charger entities including a charger entity of the charger P and a charger entity of the charger Q are stored in the queuing data 20. In this case, a first state is established such that the charger entity of the charger Q is in the second place in the order, and the charger entity of the charger P is on the head in the order. In addition, a second state is alternatively established such that the charger entity of the charger P is in the second place in the order, and the charger entity of the charger Q is on the head in the order. Thus, the first state and the second state are alternately established at a predetermined interval.

In this way, when vehicles assigned with the same priority in the electric supply condition storage unit 54 are simultaneously connected to chargers, an increase rate of a charge quantity of the battery 7 of each of the vehicles becomes substantially uniform.

Furthermore, in the second embodiment, the control unit 55 of the electric supply controller 5 sets a priority of a charger and controls the switching circuit 2 according to the priority. The structure and the method are not limited to those, as described above. For example, the operation of the second embodiment can be produced when the switching circuit 2 has a circuit structure configured to set the charger Q to be a connected destination to the electric power supply line 9 with higher priority than that of the charger P. In this case, a priority is set to each charger according to a circuit structure of the switching circuit 2. Further, in this case, the electric supply controller 5 may be omitted. That is, only the switching circuit 2 can function as an electric supply system.

In the above embodiments, a charger detects connection to a vehicle, and thereby outputting a signal, which specifies existence of connection, to the electric supply controller 5. In this manner, the electric supply controller 5 can detect connection between a vehicle and a charger. It is noted that the electric supply controller 5 is not limited to detect connection between a vehicle and a charger in this manner.

For example, the vehicle communication unit 8 may be connected to a charger via a telecommunication cable by hand when the corresponding vehicle is charged. In this case, when a vehicle is connected to a certain charger via an electric power supply line and a telecommunication cable, the vehicle communication unit 8 of the vehicle transmits a vehicle ID to a charger through the telecommunication cable. Thereby, the charger outputs the received vehicle ID to the electric supply controller 5. Thereby, on receiving the vehicle ID, the control unit 55 of the electric supply controller 5 can detect that the vehicle, which transmitted the vehicle ID to the charger, is connected to the charger, which outputted the vehicle ID to the electric supply controller 5.

For example, the vehicle communication unit 8 may perform a power line communication (PLC) through the electric supply line between a charger and the battery 7 when connected to the charger. In this case, when a vehicle is connected to a certain charger via an electric power supply line, the vehicle communication unit 8 of the vehicle transmits a vehicle ID to a charger through the electric power supply line. Thereby, the charger outputs the received vehicle ID to the electric supply controller 5. Thereby, on receiving the vehicle ID, the control unit 55 of the electric supply controller 5 can detect that the vehicle, which transmitted the vehicle ID to the charger, is connected to the charger, which outputted the vehicle ID to the electric supply controller 5.

Further, when the battery 7 of the vehicle is connected to the charger and charged full, the control unit 55 deletes the charger entity of the charger from the queuing data 20 or the invalid box data 30. Thereafter, the control unit 55 may successively obtain information on the charge quantity of the battery 7 from the vehicle connected to the charger corresponding to the eliminated charger entity. When energy of the battery 7 is consumed to be in a non-full charge state, the control unit 55 may again store the charger entity of the charger in the queuing data 20 or the invalid box data 30. In that case, a content of the charger entity to be stored is the same as a content of the eliminated charger entity. In this way, when the battery 7 consumes energy due to self-electric discharge after being charged full and reduces the charge quantity, the battery 7 can be automatically recharged.

In the first embodiment, the priority of each of the vehicles is constant. Alternatively, it is noted that the priority of each of the vehicles may be changed in the electric supply condition storage unit 54 with time progress. In this case, the control unit 55 may periodically confirm a priority assigned to each of the vehicles connected to a charger. On detection of a change in the priority, the control unit 55 may change a storage destination of a charger entity and the order of a charger entity in the queuing data 20.

In the second embodiment, the priority of each of the chargers is constant. Alternatively, it is noted that the priority of each of the chargers may be changed in the electric supply condition storage unit 54 with time progress. In this case, the control unit 55 may periodically confirm a priority assigned to each of the chargers connected to a vehicle. On detection of a change in the priority, the control unit 55 may change a storage destination of a charger entity and the order of a charger entity in the queuing data 20.

In the embodiment, each function produced by execution of a program by the control unit 55 may be produced by another hardware such as an FPGA, which can program a circuit structure having the function.

For example, it is supposed that the charger 1 shown in FIG. 1 is a generally known charger device configured to charge by applying a voltage of AC 100V or AC 200V currently supplied to an ordinary home. Accordingly, it is supposed that the electric power supply line 9 is supplied with electric power of AC 100V or AC 200V.

The above-described structure and operation may be applied to a quick charger device configured to charge by rectifying and boosting an AC power supply to produce a high voltage direct current power. In this case, a main function of the charger 1 shown in FIG. 1 is connection with a vehicle, and the electric power supply line 9 may function to supply a high voltage direct current power.

Summarizing the above embodiments, an electric supply controller to control a switching circuit to connect an electric power supply line to one switchable charger selected from multiple chargers connectable with a vehicle, the electric supply controller including:

a storage unit configured to associate information on a priority to each of at least part of multiple vehicles and configured to store the associated information therein; and a control unit configured to control the switching circuit, when at least part (e.g., at least two) of the multiple vehicles are simultaneously connected to different chargers, so as to connect an electric power supply line preferentially to one of the different chargers, the one of the different chargers being connected to one of the multiple vehicles, the one of the multiple vehicles being assigned with a highest priority in the storage unit at the time point.

The inventor of the present application noted tendency of a user to demand to determine a priority of charge for each of multiple vehicles. Specifically, a use may tend to demand to charge one vehicle with a highest priority and may tend to demand to delay charge of another vehicle. In order to satisfy such a demand, as described above, a storage unit is configured to associate information on a priority to each of the multiple vehicles and configured to store the associated information therein. In addition, the control unit is configured to control a connected destination, i.e., an electricity supplied destination of the electric power supply line in an order according to the priority. In this manner, such a demand to determine a priority of charge of each of the vehicles is satisfied. Thereby, convenience of a user of a vehicle can be enhanced.

In a condition where:

i) a first vehicle of the multiple vehicles is connected to a first charger of the multiple chargers;

ii) the switching circuit connects the electric power supply line to the first charger; and iii) a second vehicle of the multiple vehicles is newly connected to a second charger of the multiple chargers, the control unit is configured to:

i) cause the switching circuit to maintain a connected destination of the electric power supply line at the first charger when a priority assigned to the first vehicle in the storage unit is higher than a priority assigned to the second vehicle in the storage unit; and ii) cause the switching circuit to switch the connected destination of the electric power supply line to the second charger when the priority assigned to the second vehicle is higher than the priority assigned to the first vehicle.

That is, it is supposed that the first vehicle is connected to the first charger and being charged. In such a condition, the second vehicle is connected to the second charger. In this case, when the first vehicle has a higher priority, charge of the first vehicle is continued. Alternatively, when the second vehicle has a higher priority, the charged destination is changed to the second vehicle, and thereby the second vehicle is charged.

The storage unit is configured to store the priority specified with a valid period of the priority. In a condition where: i) one of the multiple vehicles is connected to one of the multiple chargers; and ii) it is out of a valid period of a priority, which is assigned to the one of the multiple vehicles and stored in the storage unit at the time point, the control unit is configured to prohibit the connected destination of the electric power supply line from being set to the one of the multiple chargers, irrespective of whether a vehicle is connected to a charger other than the one charger.

The present inventor noted that even when only one vehicle is connected to a charger, a user does not necessarily demand to charge the vehicle immediately. Specifically, for example, it suffices that a vehicle mainly used for commuting is sufficiently charged before the vehicle leaves for commuting the day after. Therefore, it may be demanded that such a vehicle mainly used for commuting is charged in a low electricity rate period such as a late-night off-peak hours and prohibited from being charged in a time period other than the low electricity rate period. Even in consideration of such a circumstance, it is convenient for a user to connect the vehicle to the charger immediately after the user returns from working, rather than waiting until the late-night off-peak hours and connecting the vehicle to the charger after start of the late-night off-peak hours.

In consideration of that, as described above, a valid period can be specified to a priority assigned to a vehicle. Thereby, irrespective of whether another vehicle is connected to a charger other than one charger connected to the vehicle, the one charger can be prohibited from being set to a connected destination of the electric power supply line when it is out of the valid period of the priority.

In a condition where:

i) a first vehicle of the multiple vehicles is connected to a first charger of the multiple chargers;

ii) a second vehicle of the multiple vehicles is connected to a second charger, of the multiple chargers;

iii) a valid period is specified to a priority assigned to the first vehicle and stored in the storage unit; and iv) a valid period is not specified to a priority assigned to the second vehicle and stored in the storage unit, the control unit may be configured to cause the switching circuit to connect the electric power supply line to the second charger when it is out of the valid period of the priority assigned to the first vehicle.

Thereafter, in a condition where it turns to be in the valid period of the priority assigned to the first vehicle, i) the control unit may be configured to cause the switching circuit to switch the connected destination of the electric power supply line to the first charger when the priority assigned to the first vehicle is higher than the priority assigned to the second vehicle; and ii) the control unit may be configured to cause the switching circuit to maintain the connected destination of the electric power supply line at the second charger when the priority assigned to the second vehicle is higher than the priority assigned to the first vehicle.

An electric supply system configured to connect an electric power supply line to one switchable charger selected from multiple chargers connectable with vehicles, in a condition where:

i) causing a switching circuit to connect the electric power supply line to a first charger of the multiple chargers, the first charger being connected to a vehicle, the electric supply system is configured to cause the switching circuit to switch an electricity supplied destination to the second charger when another vehicle is connected to a second charger of the multiple chargers, the second charger being beforehand assigned with a priority higher than a priority of the first charger.

The present inventor noted that there is a tendency to determine a priority of each of multiple chargers. Specifically, there is a demand to use a certain charger of multiple chargers to charge one battery with the highest priority and to use another charger of the multiple chargers to charge another battery with a lower priority. In order to satisfy such a demand, as described above, priorities may be respectively set to the multiple chargers. In addition, the control unit controls the connected destination, i.e., the electricity supplied destination of the electric power supply line in the order according to the priority. In this manner, such a demand to determine the priority of charge of each of the chargers is satisfied. Thereby, convenience of a user of a vehicle can be enhanced.

More specifically, the electric supply system may include:

the switching circuit configured to connect the electric power supply line to one switchable charger selected from the multiple chargers;

a storage unit configured to associate information on a priority to each of the multiple chargers and configured to store the associated information therein; and a control unit configured to cause the switching circuit, when at least part of (e.g., at least two of) the multiple chargers are simultaneously connected to corresponding vehicles, so as to connect the electric power supply line to one of the multiple chargers, the one of the multiple chargers being assigned with a highest priority in the storage unit at the time point.

The above structures of the embodiments can be combined as appropriate.

The above processings such as calculations and determinations are not limited being executed by the control unit 55.

The control unit may have various structures including the control unit 55 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An electric supply controller for controlling a switching circuit to connect an electric power supply line to one charger selected from a plurality of chargers, the plurality of chargers being connectable with a plurality of vehicles, the electric supply controller comprising:
   a storage unit configured to associate information on a priority to a vehicle ID of each of at least part of the plurality of vehicles and configured to store the associated information therein;
   a vehicle ID receiving unit configured to receive a vehicle ID from each of at least part of the plurality of vehicles connected to one of the plurality of chargers; and
   a control unit configured to control the switching circuit,
      when at least part of the plurality of vehicles are simultaneously connected to different chargers,
      to determine a priority associated with the vehicle ID that is received,
      so as to connect the electric power supply line preferentially to one of the different chargers based on the vehicle ID assigned with a highest priority among a plurality of vehicle IDs received from the at least part of the plurality of vehicles respectively,
      the one of the different chargers being connected to one of the plurality of vehicles, which is assigned with the vehicle ID associated with the highest priority.

2. The electric supply controller according to claim 1,
wherein the plurality of chargers includes a first charger and a second charger,
wherein the plurality of vehicles includes a first vehicle and a second vehicle,
in a condition where the switching circuit connects the electric power supply line to the first charger, which is being connected to the first vehicle, and the second vehicle is newly connected to the second charger, the control unit is configured to:
   cause the switching circuit to maintain the electric power supply line connected to the first charger when a priority assigned to the vehicle ID of the first vehicle is higher than a priority assigned to the vehicle ID of the second vehicle; and
   cause the switching circuit to switch the electric power supply line to be connected to the second charger when the priority assigned to the vehicle ID of the second vehicle is higher than the priority assigned to the vehicle ID of the first vehicle.

3. The electric supply controller according to claim 1,
wherein the storage unit is configured to store a priority assigned with a valid period in late night hours, and
in a condition where one of the plurality of vehicles is connected to one of the plurality of chargers, and it is out of the late night hours corresponding to the valid period assigned to the vehicle ID of a priority of the one vehicle, the control unit is configured to prohibit the electric power supply line from being connected to the one charger, irrespective of whether another vehicle is connected to a charger other than the one charger.

4. The electric supply controller according to claim 1,
wherein the plurality of chargers includes a first charger and a second charger,
wherein the plurality of vehicles includes a first vehicle and a second vehicle,
in a first condition where the first vehicle is connected to the first charger, the second vehicle is connected to the second charger, a valid period is assigned to the vehicle ID of a priority assigned to the vehicle ID of the first vehicle, and a valid period is not assigned to the vehicle ID of a priority assigned to the vehicle ID of the second vehicle, the control unit is configured to cause the switching circuit to connect the electric power supply line to the second charger when it is out of the valid period of the priority assigned to the vehicle ID of the first vehicle, and
after the first condition, in a second condition where it is in the valid period of the priority assigned to the vehicle ID of the first vehicle, the control unit is configured to:
cause the switching circuit to switch the electric power supply line to be connected to the first charger when the priority assigned to the vehicle ID of the first vehicle is higher than the priority assigned to the vehicle ID of the second vehicle; and
cause the switching circuit to maintain the electric power supply line connected to the second charger when the priority assigned to the second vehicle is higher than the priority assigned to the vehicle ID of the first vehicle.

5. The electric supply controller according to claim 1,
wherein the storage unit is further configured to associate information on the priority to the vehicle ID of each of at least part of the plurality of vehicles and configured to store the associated information therein, according to an operation of a user.

6. The electric supply controller according to claim 1,
wherein the plurality of chargers includes a first charger and a second charger,
wherein the plurality of vehicles includes a first vehicle and a second vehicle,
in a first condition where the first vehicle is connected to the first charger, the second vehicle is connected to the second charger, a valid period in late night hours is assigned to the vehicle ID of a priority assigned to the vehicle ID of the first vehicle, and a valid period in the late night hours is not assigned to the vehicle ID of a priority assigned to the vehicle ID of the second vehicle, the control unit is configured to cause the switching circuit to connect the electric power supply line to the second charger when it is out of the valid period of the priority assigned to the vehicle ID of the first vehicle, and
after the first condition, in a second condition where it is in the valid period of the priority assigned to the vehicle ID of the first vehicle, the control unit is configured to:
cause the switching circuit to switch the electric power supply line to be connected to the first charger when the priority assigned to the vehicle ID of the first vehicle is higher than the priority assigned to the vehicle ID of the second vehicle; and cause the switching circuit to maintain the electric power supply line connected to the second charger when the priority assigned to the vehicle ID of the second vehicle is higher than the priority assigned to the vehicle ID of the first vehicle.

7. A method for controlling electric supply to one of a first vehicle and a second vehicle from one of a first charger and a second charger, the method comprising:

receiving a vehicle ID from each of the first vehicle and the second vehicle connected to the first charger and the second charger, respectively;

determining a priority associated with the vehicle ID that is received, causing a switching circuit to connect the electric power supply line to the first charger being connected to the first vehicle, and causing the switching circuit to switch the electric power supply line to be connected to the second charger when the second vehicle is connected to the second charger and when a priority assigned to the vehicle ID of the second vehicle is higher than a priority assigned to the vehicle ID of the first vehicle.

8. The method according to claim 7, wherein the causing the switching circuit to switch further includes:

causing the switching circuit to switch the electric power supply line to be connected to the second charger when another vehicle is newly connected to the second charger and when a priority assigned to the second charger is higher than a priority assigned to the first charger.

9. The method according to claim 7, further comprising:

assigning the priority to the vehicle ID of the first vehicle and assigning the priority to the vehicle ID of the second vehicle according to an operation of a user.

10. An electric supply controller for controlling a switching circuit to connect an electric power supply line to one charger selected from a plurality of chargers, the plurality of chargers being connectable with a plurality of vehicles, the electric supply controller comprising:

a storage unit configured to associate information on a priority to a vehicle ID of each of at least part of the plurality of vehicles and configured to store the associated information therein;

a vehicle ID receiving unit configured to receive a vehicle ID from each of at least part of the plurality of vehicle connected to one of the plurality of chargers; and a control unit configured to control the switching circuit, when at least part of the plurality of vehicles are simultaneously connected to different chargers, to determine a priority associated with the vehicle ID that is received, so as to connect the electric power supply line preferentially to one of the different chargers based on a vehicle ID assigned with a highest priority among a plurality of vehicle IDs received from the at least part of the plurality of vehicles respectively, the one of the different chargers being connected to one of the plurality of vehicles, which is assigned with the vehicle ID associated with the highest priority, wherein the storage unit is configured to store a priority assigned with a valid period in late night hours, and in a condition where one of the plurality of vehicles is connected to one of the plurality of chargers, and it is out of the late night hours corresponding to the valid period assigned to the vehicle ID of a priority of the one vehicle, the control unit is configured to prohibit the electric power supply line from being connected to the one charger, irrespective of whether another vehicle is connected to a charger other than the one charger.

\* \* \* \* \*